United States Patent
Campbell

(10) Patent No.: US 10,754,393 B2
(45) Date of Patent: Aug. 25, 2020

(54) MULTI-PANEL COMPUTING DEVICE HAVING INTEGRATED MAGNETIC COUPLING STRUCTURE(S)

(71) Applicant: Microsoft Technology Licensing, LLC, Redmond, WA (US)

(72) Inventor: Kent Allen Campbell, Issaquah, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

(21) Appl. No.: 15/817,147

(22) Filed: Nov. 17, 2017

(65) Prior Publication Data
US 2019/0155343 A1   May 23, 2019

(51) Int. Cl.
*G06F 1/16* (2006.01)
*G06F 3/02* (2006.01)
*G09G 5/37* (2006.01)

(52) U.S. Cl.
CPC .......... *G06F 1/1681* (2013.01); *G06F 1/1616* (2013.01); *G06F 1/1618* (2013.01); *G06F 1/1637* (2013.01); *G06F 1/1677* (2013.01); *G06F 3/0213* (2013.01); *G09G 5/37* (2013.01)

(58) Field of Classification Search
CPC ..... G06F 1/1616; G06F 1/1681; G06F 1/1641
See application file for complete search history.

(56) References Cited

U.S. PATENT DOCUMENTS

| | | | | |
|---|---|---|---|---|
| 7,515,705 | B2* | 4/2009 | Segawa | G06F 1/162 |
| | | | | 379/428.01 |
| 8,688,178 | B2* | 4/2014 | Kusano | G06F 1/162 |
| | | | | 455/575.3 |
| 8,988,876 | B2* | 3/2015 | Corbin | A45C 13/002 |
| | | | | 361/679.58 |
| 9,036,340 | B1 | 5/2015 | Colby et al. | |
| 9,474,345 | B2 | 10/2016 | Smith et al. | |
| 9,489,054 | B1 | 11/2016 | Sumsion et al. | |

(Continued)

FOREIGN PATENT DOCUMENTS

| | | |
|---|---|---|
| EP | 2671139 B1 | 1/2016 |
| WO | 2017120676 A1 | 7/2017 |

OTHER PUBLICATIONS

"For Lenovo Yoga Tab 3 10.1 X50F X50M X50L Tablet Case Protective PU Leather Stand Flip Cover Magnetic Cases + Screen Protector", Retrieved From <<https://www.aliexpress.com/item/For-Lenovo-Yoga-Tab-3-10-1-X50F-X50M-X50L-Tablet-Case-Protective-PU-Leather-Stand/32809113711.html>>, 2010, 29 Pages.

(Continued)

*Primary Examiner* — Kent W Chang
(74) *Attorney, Agent, or Firm* — Wade IP Law LLC

(57) ABSTRACT

Multi-panel computing devices that have integrated magnetic coupling structure(s) are described herein. For example, a magnetic coupling structure in a panel of a multi-panel computing device may serve to magnetically couple the panel to another panel of the multi-panel computing device and/or to another object (e.g., that is exterior to the multi-panel computing device). In accordance with this example, the magnetic coupling structure may enable the multi-panel computing device to be magnetically coupled to the object without utilizing a mounting structure between the multi-panel computing device and the object.

23 Claims, 12 Drawing Sheets

(56) References Cited

U.S. PATENT DOCUMENTS

| | | |
|---|---|---|
| 9,596,914 B2 | 3/2017 | Zaloom |
| D786,877 S | 5/2017 | Christie, II |
| 9,645,609 B2 | 5/2017 | Fathollahi et al. |
| 2006/0135226 A1* | 6/2006 | Won .................. G06F 1/1616 455/575.3 |
| 2013/0176091 A1 | 7/2013 | Lancaster-Larocque |
| 2015/0083615 A1* | 3/2015 | Lay .................... G06F 1/1616 206/45.24 |
| 2016/0239053 A1 | 8/2016 | Kiple et al. |
| 2016/0261022 A1 | 9/2016 | Guterman et al. |

OTHER PUBLICATIONS

Scott, Nicole, "Maestro S Oaktrail Tablet with Magnet Cover Featuring a Built in Keyboard", Retrieved From <<http://www.netbooknews.com/23597/maestro-s-oaktrail-tablet-with-magnet-cover-featuring-a-built-in-keyboard/>>, Apr. 13, 2011, 7 Pages.

Zaniewski, Brent, "Best wall mounts for going hands-free with iPad", Retrieved From <<https://www.imore.com/going-handsfree-top-7-ipad-wall-mounts>>, Dec. 14, 2015, 15 Pages.

"International Search Report and Written Opinion Issued in PCT Application No. PCT/US18/059293", dated Feb. 1, 2019, 12 Pages.

* cited by examiner

MULTI-PANEL COMPUTING DEVICE HAVING INTEGRATED MAGNETIC COUPLING STRUCTURE(S)

BACKGROUND

In modern society, people are using devices (e.g., mobile electronic devices) increasingly more in their everyday lives. For instance, people often carry devices with which they can discover information (e.g., using a digital personal assistant), perform work, consume audio and/or video content, and communicate with friends, coworkers, and family members. It may be desirable for a user of a device to use the device in a hands-free manner. A variety of mounting solutions have been proposed to enable such hands-free use. However, conventional mounting solutions typically utilize a dedicated mount that is attached to the surface of an object (e.g., a wall) and that includes a mechanical attachment for receiving the device.

SUMMARY

Various multi-panel computing devices are described herein that have integrated magnetic coupling structure(s). For example, a magnetic coupling structure in a panel of a multi-panel computing device may serve to magnetically couple the panel to another panel of the multi-panel computing device and/or to another object (e.g., that is exterior to the multi-panel computing device). In accordance with this example, the magnetic coupling structure may enable the multi-panel computing device to be magnetically coupled to the object without utilizing a mounting structure between the multi-panel computing device and the object.

A first example device includes processor(s), first and second panels, and a hinge. The first panel has first and second opposing surfaces. The first panel includes a display that is configured to display images via the first surface in response to image data received from at least one of the processor(s). The first panel further includes a first magnetic coupling structure that includes a first magnet and/or a first ferromagnetic element. The second panel includes a second magnetic coupling structure that includes a second magnet and/or a second ferromagnetic element. The hinge is coupled between the first panel and the second panel. The second magnetic coupling structure is configured to magnetically couple to the first magnetic coupling structure at the first surface for a first hinge orientation of the hinge. The second magnetic coupling structure is configured to magnetically couple to the first magnetic coupling structure at the second surface for a second hinge orientation of the hinge.

A second example device includes processor(s), first and second panels, and a hinge. The first panel has a first surface. The first panel includes a display that is configured to display images via the first surface in response to image data received from at least one of the processor(s). The second panel has a second surface. The second panel includes a magnetic coupling structure that includes a magnet and/or a ferromagnetic element. The magnetic coupling structure is configured to magnetically attach the second surface to an object via a magnetic force between the magnetic coupling structure and the object. The hinge is coupled between the first panel and the second panel to enable the display to be viewed while the device is magnetically attached to the object.

A third example device includes processor(s), a first panel, and a second panel. The first panel has a first surface. The first panel includes a display that is configured to display images via the first surface in response to image data received from at least one of the processor(s). The second panel is coupled to the first panel. The second panel has a second surface. The second panel includes electrical circuitry configured to provide functionality to the first panel. The second panel further includes a magnetic coupling structure that includes a magnet and/or a ferromagnetic element. The magnetic coupling structure is configured to magnetically attach the second surface to an object via a magnetic force between the magnetic coupling structure and the object.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Moreover, it is noted that the invention is not limited to the specific embodiments described in the Detailed Description and/or other sections of this document. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate embodiments of the present invention and, together with the description, further serve to explain the principles involved and to enable a person skilled in the relevant art(s) to make and use the disclosed technologies.

Figure 1:
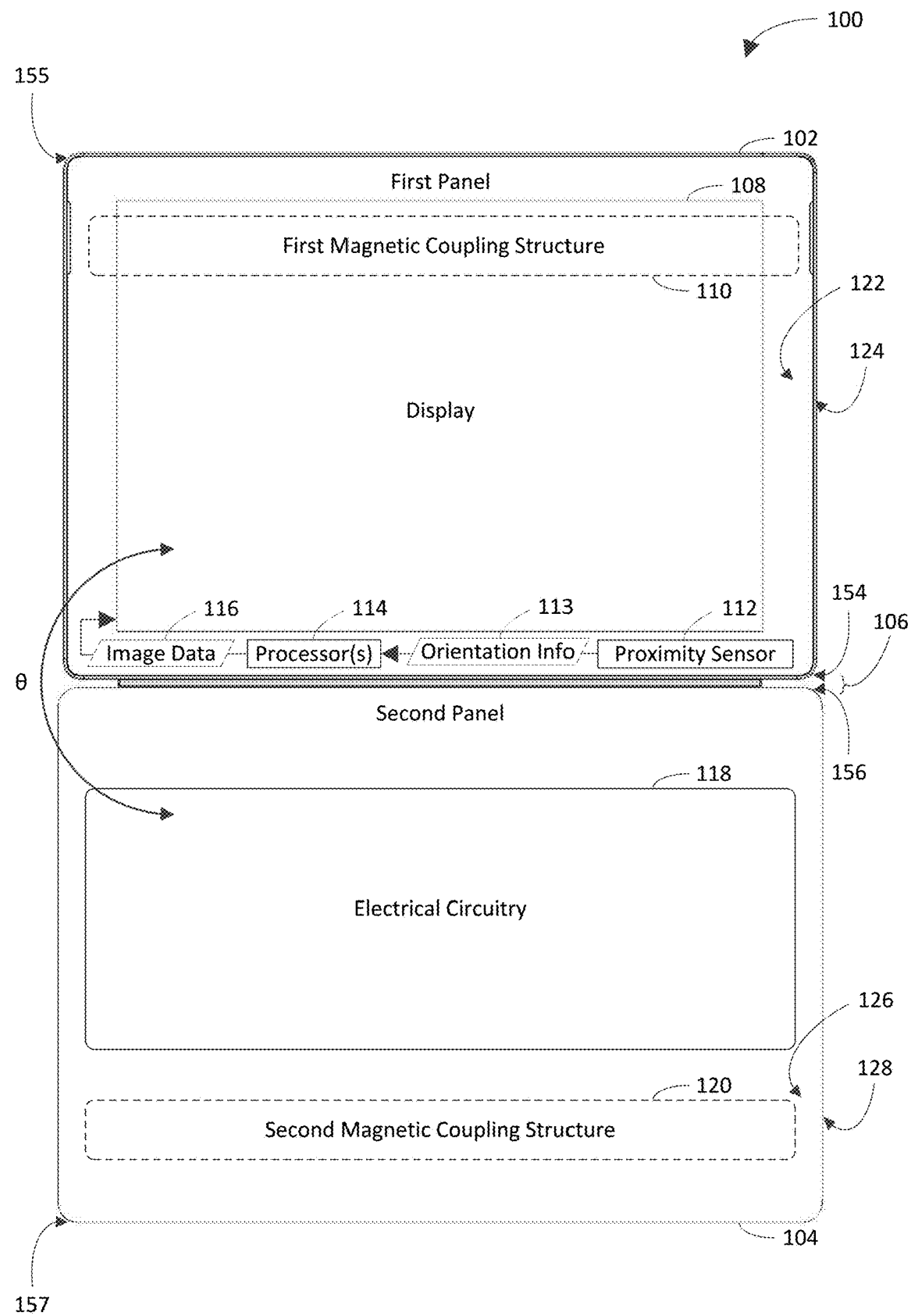
FIGS. 1-7 are views of example multi-panel computing devices in accordance with embodiments.

The features and advantages of the disclosed technologies will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description refers to the accompanying drawings that illustrate exemplary embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the relevant art(s) to implement such feature, structure, or characteristic in connection with other embodiments whether or not explicitly described.

Descriptors such as "first", "second", "third", etc. are used to reference some elements discussed herein. Such descriptors are used to facilitate the discussion of the example embodiments and do not indicate a required order of the referenced elements, unless an affirmative statement is made herein that such an order is required.

II. Example Embodiments

Example multi-panel computing devices described herein have integrated magnetic coupling structure(s). For example, a magnetic coupling structure in a panel of a multi-panel computing device may serve to magnetically couple the panel to another panel of the multi-panel computing device and/or to another object (e.g., that is exterior to the multi-panel computing device). In accordance with this example, the magnetic coupling structure may enable the multi-panel computing device to be magnetically coupled to the object without utilizing a mounting structure between the multi-panel computing device and the object.

Example techniques described herein have a variety of benefits as compared to conventional techniques for mounting a computing device. For instance, the example techniques may utilize magnetic coupling structure(s) that are integrated into panel(s) of a computing device to enable those panel(s) to be coupled to other panel(s) in the computing device and/or to object(s) that are exterior to the computing device. For example, the aforementioned techniques may be capable of mounting a computing device to a surface of an object using a magnetic force generated between the computing device and the object. The computing device may be magnetically coupled to the surface without having a mounting structure between the computing device and the object. The example techniques may enable the computing device to be mounted in an arbitrary orientation on the surface. In another example, the aforementioned techniques may enable a second panel of a computing device to be magnetically coupled to opposing sides of a first panel of the computing device. For instance, the second panel may be magnetically coupled to a first surface of the first panel in a first configuration (e.g., for storage of the computing device), and the second panel may be magnetically coupled to a second surface of the first panel in a second configuration (e.g., for viewing of a display via the first surface while the computing device is magnetically attached to an object). For example, a magnetic coupling structure in the second panel may be configured to magnetically couple to another magnetic coupling structure in the first panel and to yet another magnetic coupling structure in the object.

The example techniques may obviate a need for a dedicated mount and/or a third-party accessory to mount a computing device to an object, which may avoid adding bulk (e.g., physical size) and/or compromising appearance of the computing device. The example techniques may incorporate a magnetic coupling structure into a panel that has other utility. In accordance with this example, the panel may include input component(s) (e.g., keyboard, key pad, game controller, battery, battery charger) and/or output component(s) (e.g., projector, camera, speaker, battery, battery charger). The example techniques may increase speed and/or convenience with which a computing device is capable of being mounted to an object. The example techniques may be less costly than conventional techniques for mounting a computing device.

The example techniques may increase user interaction performance. For example, the aforementioned techniques may enable a user to quickly and easily mount a computing device to an object to enable the user to interact with the computing device in a hands-free manner. In another example, the aforementioned techniques may enable a user to quickly and easily unmount a computing device from an object. For instance, the user may use one hand to pull an edge of the computing device from the object. The example techniques may increase user efficiency. For example, the aforementioned techniques may reduce a number of steps that a user takes to mount a computing device to an object. In another example, the aforementioned techniques may reduce an amount of time that a user takes to mount a computing device to an object.

FIGS. 1-7 are views of example multi-panel computing devices 100, 200, 300, 400, 500, 600, and 700 in accordance with embodiments. Each of the multi-panel computing devices 100, 200, 300, 400, 500, 600, and 700 is a processing system. An example of a processing system is a system that includes at least one processor that is capable of manipulating data in accordance with a set of instructions. For instance, a processing system may be a computer, a personal digital assistant, or a cellular telephone. Accordingly, each of the multi-panel computing devices 100, 200, 300, 400, 500, 600, and 700 may be a portable multi-panel computing device, though the scope of the example embodiments is not limited in this respect.

As shown in FIG. 1, the multi-panel computing device 100 includes a first panel 102, a second panel 104, and a hinge 106. The hinge 106 is coupled between the first panel 102 and the second panel 104. The first panel 102 has a first surface 122 and a second surface 124. The second surface 124 is opposite the first surface 122. The second panel 104 has a third surface 126 and a fourth surface 128. The fourth surface 128 is opposite the third surface 126. Rotation of the hinge 106 causes an angle (a.k.a. hinge angle) θ between the first surface 122 of the first panel 102 and the third surface 126 of the second panel 104 to change. For example, rotating the hinge 106 such that the first surface 122 rotates toward the third surface 126 and/or such that the third surface 126 rotates toward the first surface 122 causes the hinge angle to decrease. Rotating the hinge 106 such that the first surface 122 rotates away from the third surface 126 and/or such that the third surface 126 rotates away from the first surface 122 causes the hinge angle to increase. In one example, rotating the hinge 106 such that the hinge angle is approximately zero degrees causes the first surface 122 of the first panel 102 to face the third surface 126 of the second panel 104 and further causes the second surface 124 of the first panel 102 to face away from the fourth surface 128 of the second panel 104, which may enable the first surface 122 to be magnetically connected to the third surface 126. In another example, rotating the hinge 106 such that the hinge angle is approximately 360 degrees causes the second surface 124 of the first panel to face the fourth surface 128 of the second panel 104 and further causes the first surface 122 of the first panel 102 to face away from the third surface 126 of the second panel 104, which may enable the second surface 124 to be magnetically connected to the fourth surface 128.

The first panel 102 includes a display 108, a first magnetic coupling structure 110, a proximity sensor 112, and processor(s) 114. The display 108 is configured to display images via the first surface 122 in response to image data 116 received from the processor(s) 114.

The first magnetic coupling structure 110 includes a first magnet and/or a first ferromagnetic element. It will be recognized that the first magnet may include a single magnet or multiple magnets. It will be further recognized that the first ferromagnetic element may include a single ferromagnetic element or multiple ferromagnetic elements. The first magnetic coupling structure 110 is configured to magnetically interact with a second magnetic coupling structure 120, which is included in the second panel 104, to cause the first panel 102 to become magnetically coupled to the second panel 104. For example, the magnetic interaction may cause the third surface 126 of the second panel 104 to become magnetically coupled to the first surface 122 of the first panel 102 for a first hinge orientation of the hinge 106 (e.g., a hinge angle of approximately zero degrees). In accordance with this example, the hinge 106 being in the first hinge orientation may place the first surface 122 proximate the third surface 126 (e.g., within 1 millimeter or one-quarter of an inch from the third surface 126). In another example, the magnetic interaction may cause the fourth surface 128 of the second panel 104 to become magnetically coupled to the second surface 124 of the first panel 102 for a second hinge orientation of the hinge 106 (e.g., a hinge angle of approximately 360 degrees). In accordance with this example, the hinge 106 being in the second hinge orientation may place the second surface 124 proximate the fourth surface 128.

The proximity sensor 112 is configured to determine a relative orientation of the second panel 104 with reference to the first panel 102. The proximity sensor 112 may generate orientation information 113 in response to determining the relative orientation. For instance, the orientation information 113 may indicate (e.g., specify) the relative orientation of the second panel 104 with reference to the first panel 102. The proximity sensor 112 is shown to be included in the first panel 102 for non-limiting, illustrative purposes. It will be recognized that the proximity sensor 112 may be included in second panel 104. One example of a proximity sensor is a Hall effect sensor. A Hall effect sensor is a transducer that is configured to vary its output voltage in response to a magnetic field.

The processor(s) 114 are configured to execute computer-readable instructions to perform operations. For instance, the processor(s) 114 may execute such computer-readable instructions to control (e.g., enable, disable, change calibration of) software and hardware components of the multi-panel computing device 100. Accordingly, the processor(s) 114 may execute such computer-readable instructions to generate the image data 116 that is to be displayed via the display 108.

The processor(s) 114 may perform at least some operations based at least in part on the orientation information 113 that is generated by the proximity sensor 112. In a first example, the processor(s) 114 may modify an appearance of a user interface that is to be displayed by the display 108 based at least in part on the orientation information 113 (e.g., based at least in part on the relative orientation of the second panel 104 with reference to the first panel 102, as indicated by the orientation information 113). For instance, the processor(s) 114 may change an orientation of the user interface (e.g., from portrait mode to landscape mode, and/or vice versa), remove interface element(s) from the user interface, and/or add interface element(s) to the user interface.

In a second example, the processor(s) 114 may enable and/or disable input-output component(s) of the multi-panel computing device 100 based at least in part on the orientation information 113. An input-output component is a component that is capable of being used as an input component and/or that is capable of being used as an output component. Examples of an input component include but are not limited to a microphone, a display (e.g., touch-enabled display), a keyboard, a key pad, a game controller, an electronic pen, a camera (e.g., video camera and/or still-image camera), a battery, and a battery charger. Examples of an output component include but are not limited to a speaker, a display, a tactile stimulation component, an electrode, a projector, a battery, and a battery charger. In accordance with the second example, the processor(s) 114 may enable first input-output component(s) and/or disable second input-output component(s) based at least in part on the orientation information 113. Any one or more of the input-output component(s) may be included in the first panel 102 and/or the second panel 104. For instance, a first portion of an input-output component may be included in the first panel 102, and a second portion of the input-output component may be included in the second panel 104.

In a third example, the processor(s) 114 may modify calibration of input-output component(s) of the multi-panel computing device 100 based at least in part on the orientation information 113. For instance, the processor(s) 114 may modify volume of a speaker, sensitivity of a microphone, brightness of a display, and/or an aperture or focal length of a camera. For example, if the first panel 102 is proximate the second panel 104 (e.g., the hinge angle is approximately 0 degrees or approximately 360 degrees), the processor(s) 114 may increase the volume of the speaker, increase sensitivity of the microphone, increase brightness of the display, and/or increase the focal length (i.e., reduce the aperture) of the camera in anticipation of the multi-panel computing device 100 being mounted to a magnetic or ferromagnetic surface and/or the mounting of the multi-panel computing device 100 creating a greater distance between the multi-panel computing device 100 and a user of the multi-panel computing device 100. In another example, if the first panel 102 is not proximate the second panel 104 (e.g., the hinge angle is between approximately 90 degrees and approximately 180 degrees, the processor(s) 114 may decrease the volume of the speaker, decrease sensitivity of the microphone, decrease brightness of the display, and/or decrease the focal length (i.e., increase the aperture) of the camera based on a determination that the multi-panel computing device 100 is being used in a laptop mode.

In a fourth example, the processor(s) 114 may enable and/or disable antenna(s) of the multi-panel computing device 100 based at least in part on the orientation information 113. Accordingly, the processor(s) 114 may enable first antenna(s) and/or disable second antenna(s) based at least in part on the orientation information 113. Any one or more of the antenna(s) may be included in the first panel 102 and/or the second panel 104. It will be recognized that each of the antenna(s) may constitute an input-output component.

In a fifth example, the processor(s) 114 may modify calibration of antenna(s) of the multi-panel computing device 100 based at least in part on the orientation information 113. For instance, the processor(s) 114 may increase or decrease a power associated with an antenna. In one example, if the first panel 102 is proximate the second panel 104 (e.g., the hinge angle is approximately 360 degrees), the processor(s) 114 may increase the power associated with the antenna. In another example, if the first panel 102 is not proximate the second panel 104 (e.g., the hinge angle is between approximately 90 degrees and approximately 180 degrees), the processor(s) 114 may decrease the power associated with the antenna.

The second panel 104 includes electrical circuitry 118 and the second magnetic coupling structure 120. The electrical circuitry 118 (e.g., hardware) provides functionality to the first panel 102. For example, the electrical circuitry 118 may be incorporated into any of a variety of components, including but not limited to an input component (e.g., keyboard, key pad, game controller, battery, battery charger) and/or an output component (e.g., projector, camera, speaker, battery, battery charger). For instance, the camera may have features (e.g., an optical zoom lens) in addition to features that another camera in the first panel 102 has. In accordance with this example, the second panel 104 may include any one or more of such components.

The second magnetic coupling structure 120 includes a second magnet and/or a second ferromagnetic element. It will be recognized that the second magnet may include a single magnet or multiple magnets. It will be further recognized that the second ferromagnetic element may include a single ferromagnetic element or multiple ferromagnetic elements. In an example, the second magnetic coupling structure 120 may be configured to magnetically interact with the first magnetic coupling structure 110 to cause the second panel 104 to become magnetically coupled to the first panel 102. In another example, the second magnetic coupling structure 120 may be configured to magnetically interact with an object that is external to the multi-panel computing device 100 to cause the second panel 104 to become magnetically attached to the object. For instance, the object may include a third magnetic coupling structure. Examples of such an object include but are not limited to a wall (e.g., a whiteboard or chalkboard thereon), a refrigerator, a stationary bicycle, a headrest of a seat in an automobile, and a shopping cart. In an aspect, the second magnetic coupling structure 120 may be configured to magnetically attach to the first magnetic coupling structure 110 (and/or vice versa) while the second magnetic coupling structure 120 is magnetically attached to the object.

One type of magnet that may be included in the first magnetic coupling structure 110 and/or the second magnetic coupling structure 120 is an electro-magnet. An electro-magnet is a magnet that produces a magnetic field in response to an electric current. For instance, increasing a magnitude (e.g., absolute value) of the electric current that is supplied to the electro-magnet may increase an intensity of the magnetic field, and decreasing the magnitude of the electric current may decrease the intensity of the magnetic field. Accordingly, an electro-magnet that is included in the second magnetic coupling structure 120 may be controllable (e.g., via an electric current) to (1) selectively magnetically attach the fourth surface 128 to an object that is exterior to the multi-panel computing device 100 while the hinge 106 is in a first hinge orientation (e.g., in which the hinge angle is approximately zero degrees) and/or (2) selectively magnetically attach the third surface 126 to such an object while the hinge 106 is in a second hinge orientation (e.g., in which the hinge angle is approximately 360 degrees).

The hinge 106 is coupled between a first connection edge 154 of the first panel 102 and a second connection edge 156 of the second panel 104. The first magnetic coupling structure 110 is shown in FIG. 1 to be proximate an edge 155 of the first panel 102 that is opposite the first connection edge 154 for non-limiting illustrative purposes. Second magnetic coupling structure 120 is shown in FIG. 1 to be proximate an edge 157 of the second panel 104 that is opposite the second connection edge 156 for non-limiting illustrative purposes. It will be recognized that the first magnetic coupling structure 110 may be positioned at any suitable location in the first panel 102 (e.g., proximate the first connection edge 154 or approximately midway between the opposing edges 154 and 155), and the second magnetic coupling structure 120 may be positioned at any suitable location in the second panel 104 (e.g., proximate the second connection edge 156 or approximately midway between the opposing edges 156 and 157). The first magnetic coupling structure 110 (or any portion thereof) and/or the second magnetic coupling structure 120 (or any portion thereof) may be incorporated into a form factor of the multi-panel computing device 100.

It will be recognized that the multi-panel computing device 100 may not include one or more of the hinge 106, the display 108, the first magnetic coupling structure 110, the proximity sensor 112, the electrical circuitry 118, and/or the second magnetic coupling structure 120. Furthermore, the multi-panel computing device 100 may include components in addition to or in lieu of the hinge 106, the display 108, the first magnetic coupling structure 110, the proximity sensor 112, the electrical circuitry 118, and/or the second magnetic coupling structure 120. For instance, the multi-panel computing device 100 may include orientation sensor(s). Examples of an orientation sensor include but are not limited to an accelerometer and a gyroscope. Each of the first panel 102 and the second panel 104 may include one or more orientation sensors, which may operate in collaboration with other orientation sensor(s) or independently from other orientation sensor(s). Such orientation sensor(s) may be capable of providing orientation information 113 to indicate an orientation of the first panel 102 with reference to the second panel 104 and/or vice versa. Accordingly, the orientation information 113 may indicate the hinge angle θ.

Figure 2:
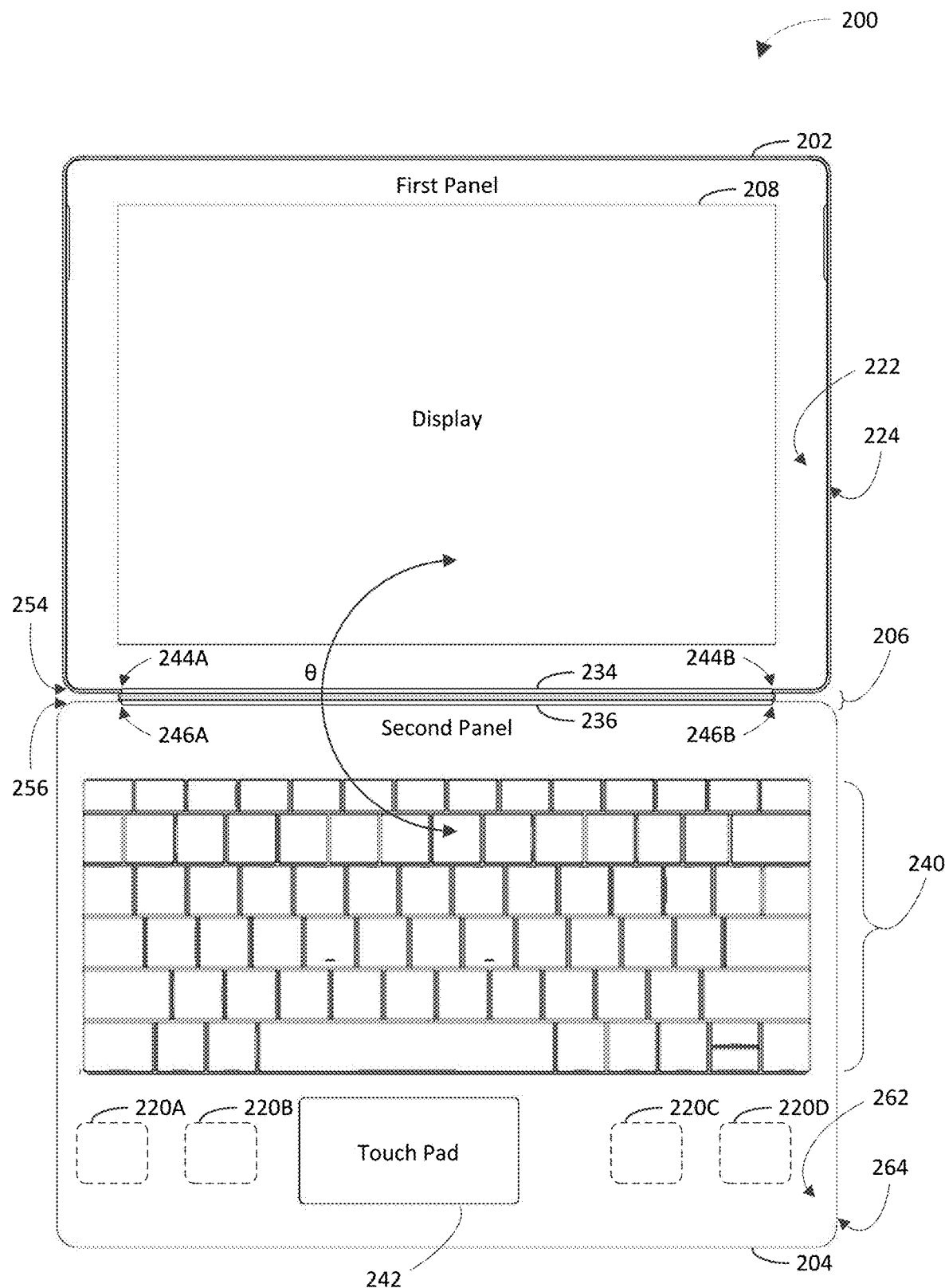

As shown in FIG. 2, the multi-panel computing device 200 includes a first panel 202, a second panel 204, and a hinge 206. The first panel 202 has first and second opposing surfaces 222 and 224. The first panel 202 includes a display 208. The display 208 is operable in a manner similar to the display 108 described above with reference to FIG. 1.

The second panel 204 has first and second opposing surfaces 262 and 264. The second panel 204 includes a plurality of magnetic coupling structures 220A-220D, a keyboard 240, and a touch pad 242 for non-limiting illustrative purposes. The keyboard 240 includes a plurality of keys that are capable of being pressed by a user of the multi-panel computing device 200 to provide input information for processing by the multi-panel computing device 200. The touch pad 242 is a pointing device that is configured to translate position and motion of the user's finger(s) along a surface of the touch pad 242 into position and motion of a cursor on the display 208. The magnetic coupling structures 220A-220D are operable in a manner similar to the second magnetic coupling structure 120 described above with reference to FIG. 1. For instance, each of the magnetic coupling structures 220A-220D includes magnet(s) and/or ferromagnetic element(s). Each of the magnetic coupling structures 220A-220D may be configured to magnetically couple the second panel 204 to the first panel 202 and/or to an object that is external to the multi-panel computing device 200. The magnetic coupling structures 220A-220B are positioned adjacent a first side of a touch pad 242, and the magnetic coupling structures 220C-220D are positioned adjacent a second side of the touch pad 242 that is opposite the first side, for non-limiting illustrative purposes. It will be recognized that the magnetic coupling structures 220A-220B may be positioned in any suitable arrangement in the second panel 204.

The hinge 206 is coupled between the first panel 202 and the second panel 204. The hinge 206 is shown to include a first connector 234 and a second connector 236. The first connector 234 has a first end 244A and a second end 244B along a first connection edge 254 of the first panel 202. The second connector 236 has a first end 246A and a second end 246B along a second connection edge 256 of the second panel 204. The second connector 236 is shown to be connected to the first connector 234 in a first connector orientation for non-limiting, illustrative purposes. The first connector orientation is characterized by the first end 244A of the first connector 234 aligning with the first end 246A of the second connector 236 and is further characterized by the second end 244B of the first connector 234 aligning with the second end 246B of the second connector 236.

While the first connector 234 and the second connector 236 are connected in the first connector orientation, the hinge 206 may be rotated to be in any suitable orientation. For example, the hinge 206 may be rotated to be in a first hinge orientation in which the first surface 222 of the first panel 202 faces second panel 204. In the embodiment of FIG. 2, the first surface 222 of the first panel 202 faces the first surface 262 of the second panel 204 for the first hinge orientation. In accordance with this example, the hinge angle θ between the first surface 222 of the first panel 202 and the first surface 262 of the second panel 204 may be approximately zero degrees. While the hinge 206 is in the first hinge orientation, the magnetic coupling structures 220A-220D may magnetically attach (e.g., releasably magnetically attach) the second surface 264 of the second panel 204 to an object (e.g., a vertical surface of the object) that is exterior to the multi-panel computing device 200 (e.g., in absence of a mounting structure between the multi-panel computing device 200 and the object). In an aspect of this example, the magnetic coupling structures 220A-220D magnetically attach the second surface 264 of the second panel 204 to the object via a magnetic force between the magnetic coupling structures 220A-220D and the object. In accordance with this aspect, the magnetic force is normal to the second surface 264 of the second panel 204 and results in a frictional force that is greater than a tractive force between the second surface 264 of the second panel 204 and the object. In further accordance with this aspect, the frictional force and the tractive force are parallel with the second surface 264 of the second panel 204, and the frictional force opposes the tractive force.

In another example, the hinge 206 may be rotated to be in a second hinge orientation in which the second surface 224 of the first panel 202 faces the second panel 204. In the embodiment of FIG. 2, the second surface 224 of the first panel 202 faces the second surface 264 of the second panel 204 for the second hinge orientation. In accordance with this example, the hinge angle θ between the first surface 222 of the first panel 202 and the first surface 262 of the second panel 204 may be approximately 360 degrees. While the hinge 206 is in the second hinge orientation, the magnetic coupling structures 220A-220D may magnetically attach (e.g., releasably magnetically attach) the first surface 262 of the second panel 204 to an object (e.g., a vertical surface of the object) that is exterior to the multi-panel computing device 200 (e.g., in absence of a mounting structure between the multi-panel computing device 200 and the object). For instance, the hinge 206 being in the second hinge orientation may enable the display 208 to be viewed while the first surface 262 of the second panel 204 is magnetically attached to the object. In an aspect of this example, the magnetic coupling structures 220A-220D magnetically attach the first surface 262 of the second panel 204 to the object via a magnetic force between the magnetic coupling structures 220A-220D and the object. In accordance with this aspect, the magnetic force is normal to the first surface 262 of the second panel 204 and results in a frictional force that is greater than a tractive force between the first surface 262 of the second panel 204 and the object. In further accordance with this aspect, the frictional force and the tractive force are parallel with the first surface 262 of the second panel 204, and the frictional force opposes the tractive force.

Figure 3:
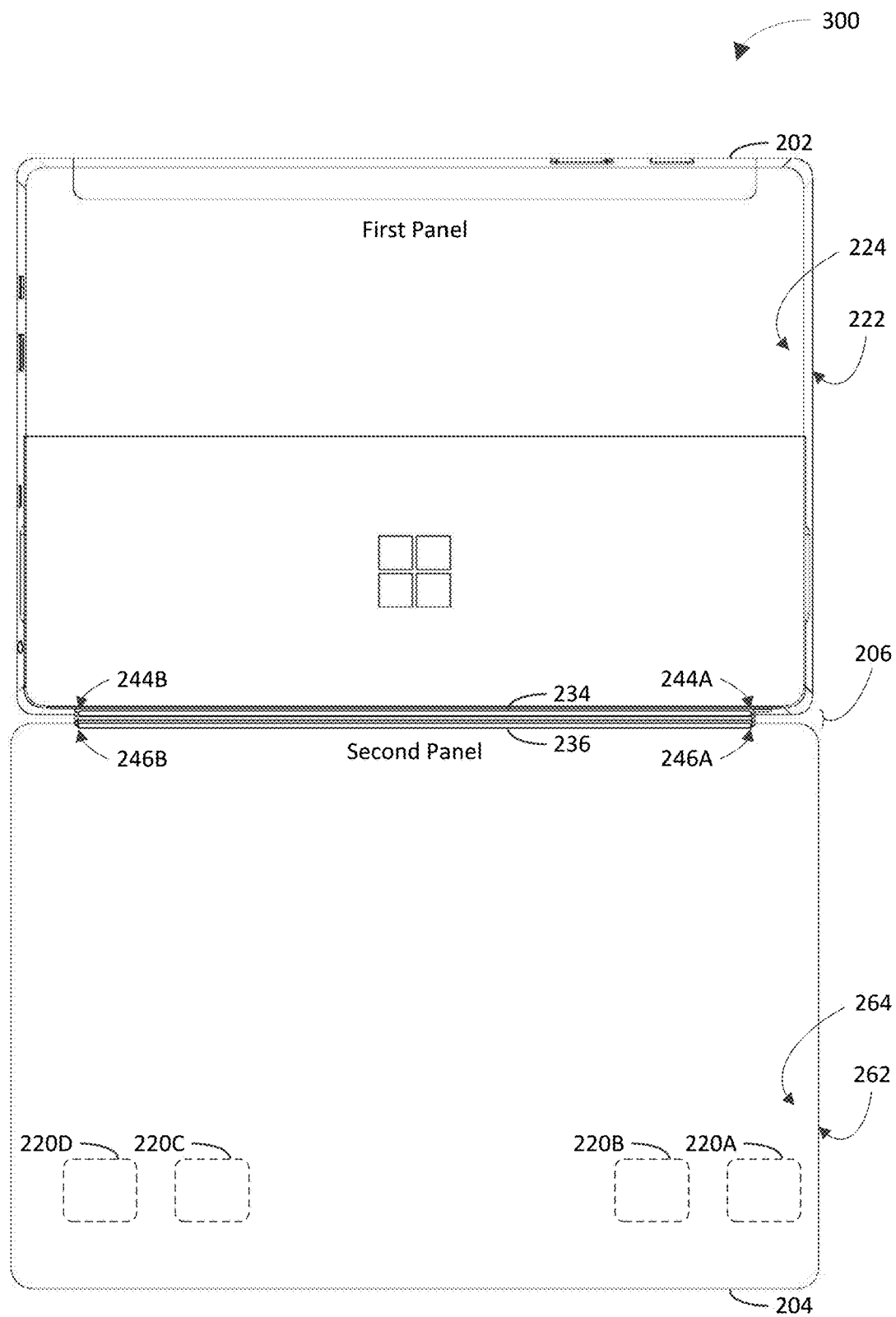

As shown in FIG. 3, the multi-panel computing device 300 includes the first panel 202, the second panel 204, and the hinge 206 as oriented in FIG. 2, though shown from a back perspective rather than a front perspective. The first panel 202 has the first and second opposing surfaces 222 and 224, and the second panel 204 has the first and second opposing surfaces 262 and 264. The second panel 204 is shown to include the magnetic coupling structures 220A-220D. The display 208, the keyboard 240, and the touch pad 242 from FIG. 2 cannot be seen in the back perspective of FIG. 3.

The hinge 206 is shown to include the first connector 234 and the second connector 236. The first end 244A and the second end 244B are shown on respective right and left sides of the first connector 234 in FIG. 3; whereas, the first end 244A and the second end 244B are shown on respective left and right sides of the first connector 234 in FIG. 2. The first end 246A and the second end 246B are shown on respective right and left sides of the second connector 236 in FIG. 3; whereas, the first end 246A and the second end 246B are shown on respective left and right sides of the second connector 236 in FIG. 2. The second connector 236 is shown to be connected to the first connector 234 in the first connector orientation, which is consistent with FIG. 2, for non-limiting, illustrative purposes. As described above, the first connector orientation is characterized by the first end 244A of the first connector 234 aligning with the first end 246A of the second connector 236 and is further characterized by the second end 244B of the first connector 234 aligning with the second end 246B of the second connector 236.

Figure 4:
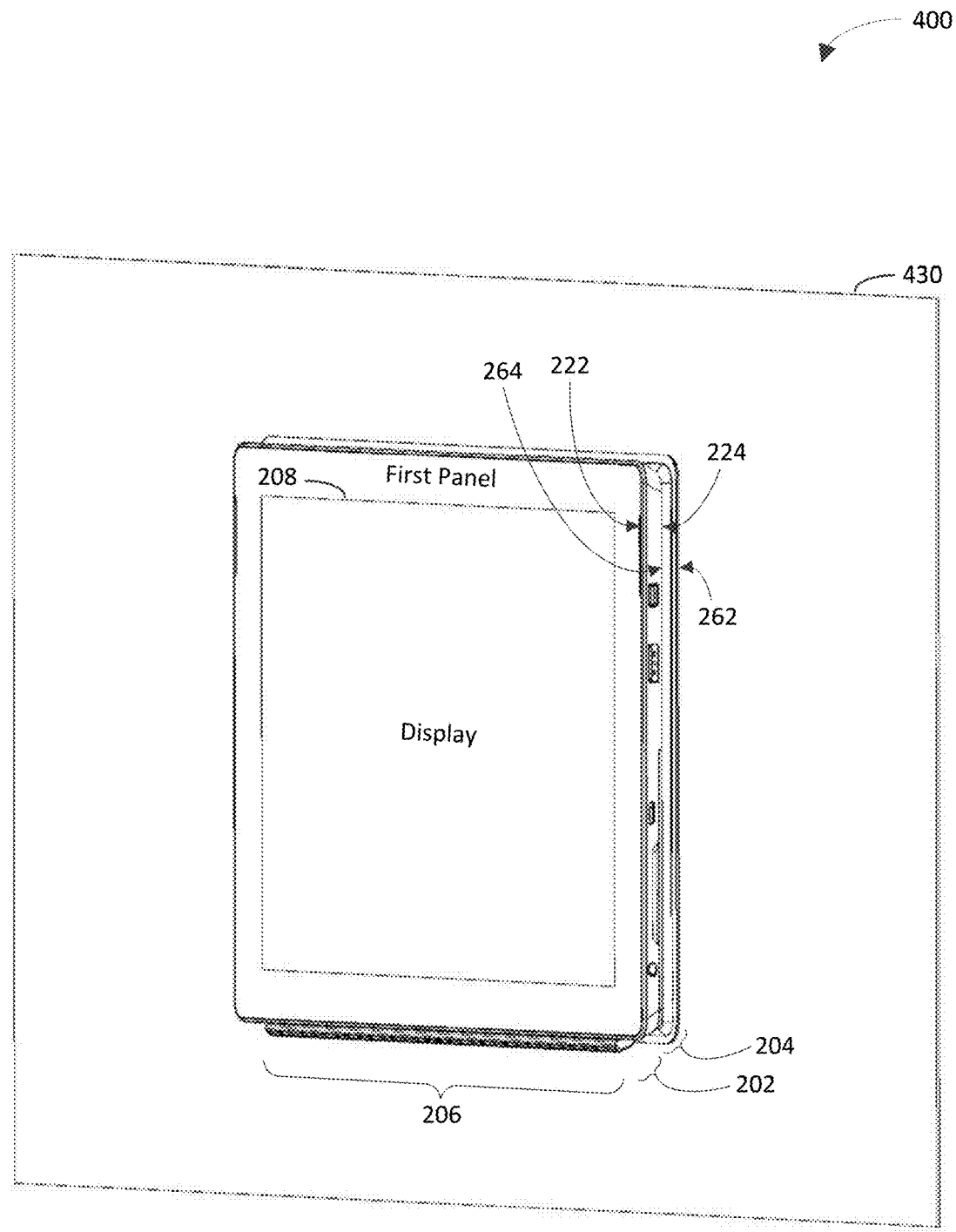

As shown in FIG. 4, the multi-panel computing device 400 includes the first panel 202, the second panel 204, and the hinge 206 of FIG. 2. The first panel 202 has the first and second opposing surfaces 222 and 224, and the second panel 204 has the first and second opposing surfaces 262 and 264. The first panel 202 includes the display 208, and the hinge 206 is shown to have the second hinge orientation. Assuming that connectors in the hinge 206 have the first connector orientation as described above with reference to FIGS. 2-3, the second surface 224 of the first panel 202 faces the second surface 264 of the second panel 204, and the first surface 222 of the first panel 202 faces away from the first surface 262 of the second panel 204.

The first surface 262 of the second panel 204 is shown to be magnetically attached to an object 430 that is exterior to the multi-panel computing device 400 in absence of a mounting structure between the multi-panel computing device 400 and the object 430. The hinge 206 being in the second hinge orientation enables the display 208 to be viewed while the first surface 262 of the second panel 204 is magnetically attached to the object 430. The first surface 262 of the second panel 204 is shown to be attached to a vertical, smooth surface of the object 430 for illustrative purposes and is not intended to be limiting. It will be recognized that the surface of the object 430 to which the second panel 204 magnetically attaches may have any suitable slope, texture, and shape.

Figure 5:
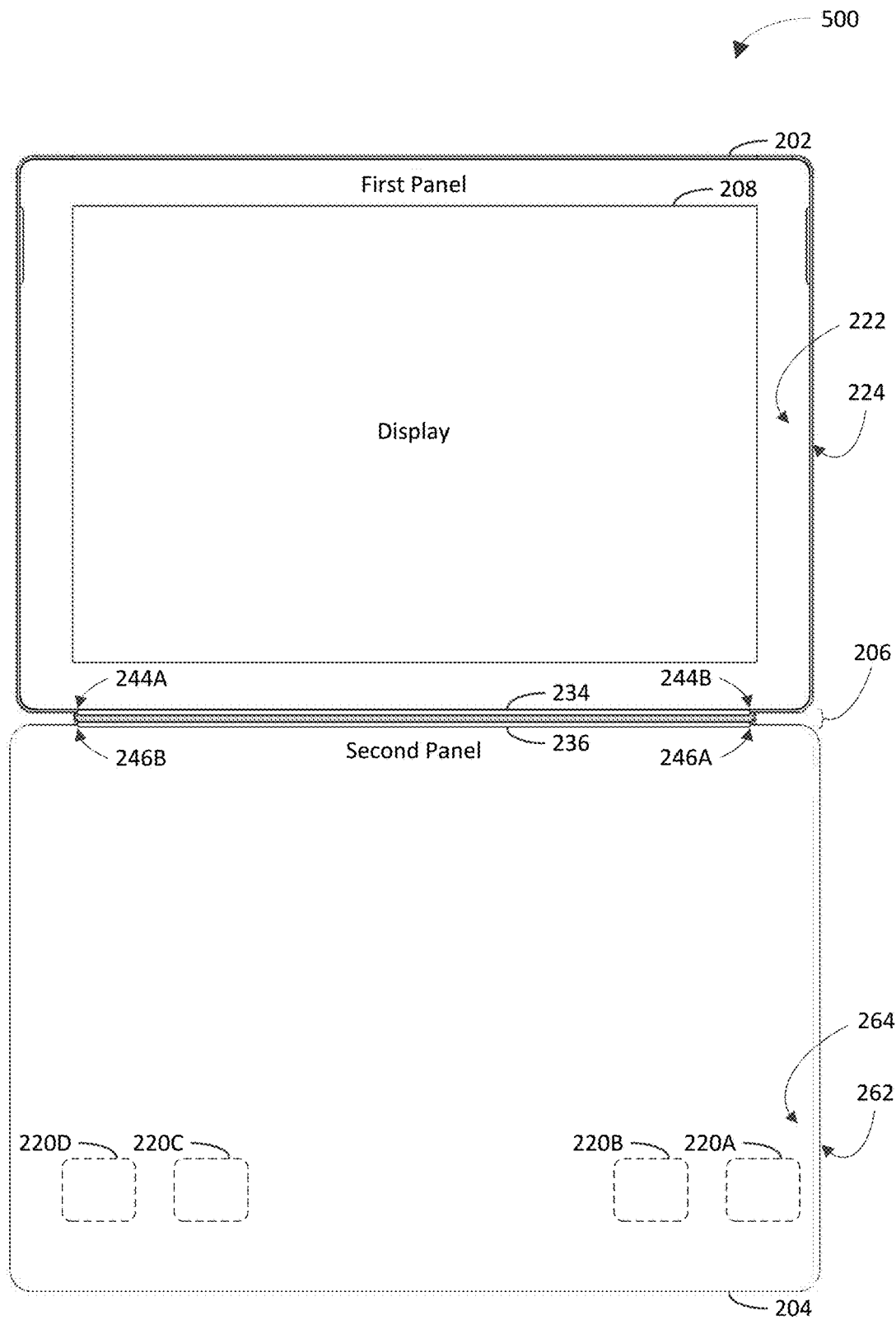

As shown in FIG. 5, the multi-panel computing device 500 includes the first panel 202, the second panel 204, and the hinge 206. The first panel 202 has the first and second opposing surfaces 222 and 224. The first panel 202 includes the display 208, which is viewable via the first surface 222. The second panel 204 has the first and second opposing surfaces 262 and 264. The second panel 204 includes the magnetic coupling structures 220A-220D. The keyboard 240 and the touch pad 242 of the second panel 204 cannot be seen in FIG. 5 because the first connector 234 and the second connector 236 of the hinge 206 are connected in the second connector orientation. As described above, the second connector orientation is characterized by the first end 244A of the first connector 234 aligning with the second end 246B of the second connector 236 and is further characterized by the second end 244B of the first connector 234 aligning with the first end 246A of the second connector 236.

While the first connector 234 and the second connector 236 are connected in the second connector orientation, the hinge 206 may be rotated to be in any suitable orientation. For example, the hinge 206 may be rotated to be in the first hinge orientation in which the first surface 222 of the first panel 202 faces second panel 204. In the embodiment of FIG. 5, the first surface 222 of the first panel 202 faces the second surface 264 of the second panel 204 for the first hinge orientation. In accordance with this example, the hinge angle θ between the first surface 222 of the first panel 202 and the second surface 264 of the second panel 204 may be approximately zero degrees. While the hinge 206 is in the first hinge orientation, the magnetic coupling structures 220A-220D may magnetically attach (e.g., releasably magnetically attach) the first surface 262 of the second panel 204 to an object (e.g., a vertical surface of the object) that is exterior to the multi-panel computing device 500 (e.g., in absence of a mounting structure between the multi-panel computing device 500 and the object). In an aspect of this example, the magnetic coupling structures 220A-220D magnetically attach the first surface 262 of the second panel 204 to the object via a magnetic force between the magnetic coupling structures 220A-220D and the object. In accordance with this aspect, the magnetic force is normal to the first surface 262 of the second panel 204 and results in a frictional force that is greater than a tractive force between the first surface 262 of the second panel 204 and the object. In further accordance with this aspect, the frictional force and the tractive force are parallel with the first surface 262 of the second panel 204, and the frictional force opposes the tractive force.

In another example, the hinge 206 may be rotated to be in the second hinge orientation in which the second surface 224 of the first panel 202 faces the second panel 204. In the embodiment of FIG. 5, the second surface 224 of the first panel 202 faces the first surface 262 of the second panel 204 for the second hinge orientation. In accordance with this example, the hinge angle θ between the first surface 222 of the first panel 202 and the second surface 264 of the second panel 204 may be approximately 360 degrees. While the hinge 206 is in the second hinge orientation, the magnetic coupling structures 220A-220D may magnetically attach (e.g., releasably magnetically attach) the second surface 264 of the second panel 204 to an object (e.g., a vertical surface of the object) that is exterior to the multi-panel computing device 500 (e.g., in absence of a mounting structure between the multi-panel computing device 500 and the object). For instance, the hinge 206 being in the second hinge orientation may enable the display 208 to be viewed while the second surface 264 of the second panel 204 is magnetically attached to the object. In an aspect of this example, the magnetic coupling structures 220A-220D magnetically attach the second surface 264 of the second panel 204 to the object via a magnetic force between the magnetic coupling structures 220A-220D and the object. In accordance with this aspect, the magnetic force is normal to the second surface 264 of the second panel 204 and results in a frictional force that is greater than a tractive force between the second surface 264 of the second panel 204 and the object. In further accordance with this aspect, the frictional force and the tractive force are parallel with the second surface 264 of the second panel 204, and the frictional force opposes the tractive force.

Figure 6:
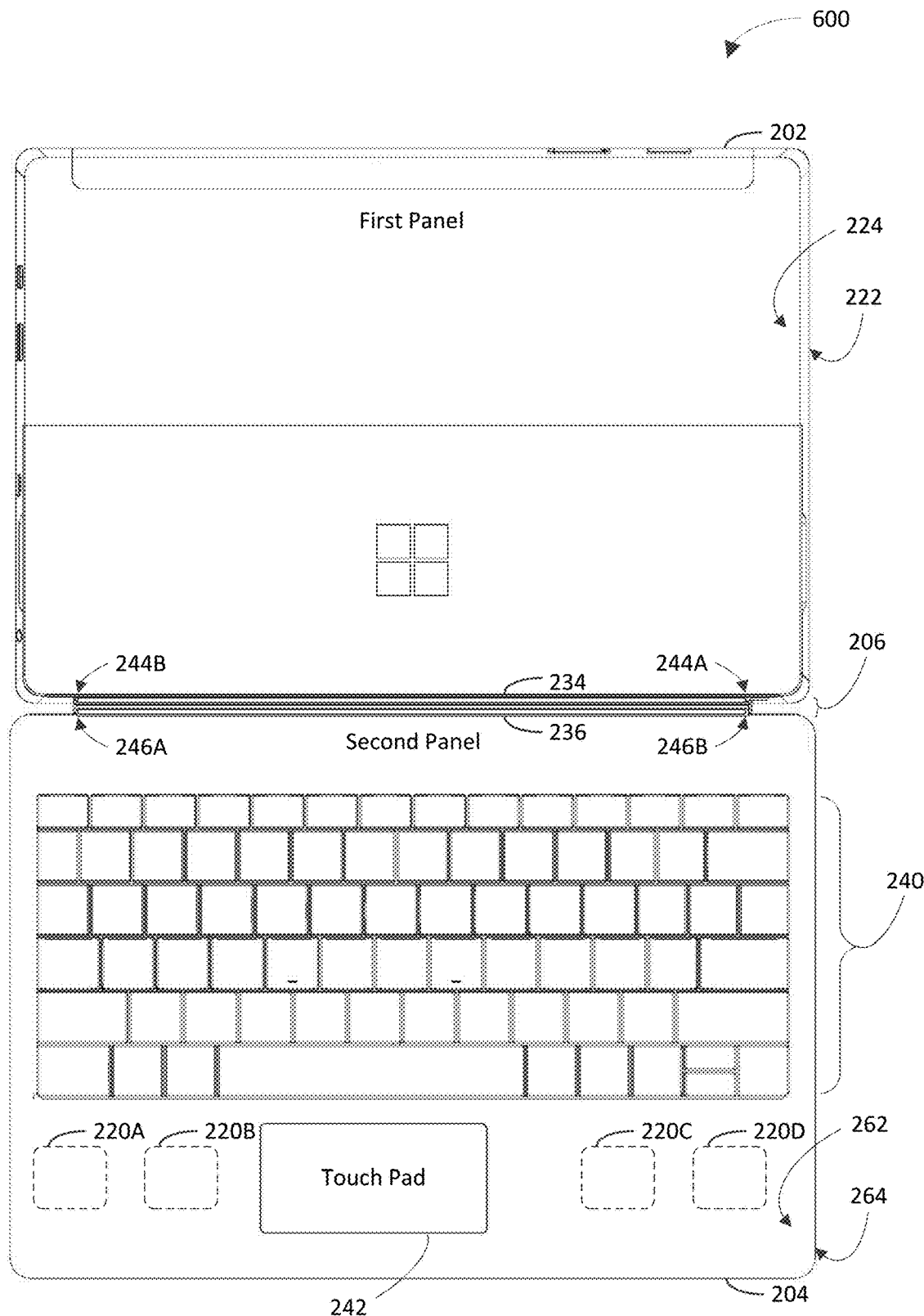

As shown in FIG. 6, the multi-panel computing device 600 includes the first panel 202, the second panel 204, and the hinge 206 as oriented in FIG. 5, though shown from a back perspective rather than a front perspective. The first panel 202 has the first and second opposing surfaces 222 and 224, and the second panel 204 has the first and second opposing surfaces 262 and 264. The display 208 cannot be seen in the back perspective of FIG. 6. The second panel 204 is shown to include the magnetic coupling structures 220A-220D, the keyboard 240, and the touch pad 242.

The hinge 206 is shown to include the first connector 234 and the second connector 236. The first end 244A and the second end 244B are shown on respective right and left sides of the first connector 234 in FIG. 6; whereas, the first end 244A and the second end 244B are shown on respective left and right sides of the first connector 234 in FIG. 5. The first end 246A and the second end 246B are shown on respective left and right sides of the second connector 236 in FIG. 6; whereas, the first end 246A and the second end 246B are shown on respective right and left sides of the second connector 236 in FIG. 5. The second connector 236 is shown to be connected to the first connector 234 in the second connector orientation, which is consistent with FIG. 5, for non-limiting, illustrative purposes. As described above, the second connector orientation is characterized by the first end 244A of the first connector 234 aligning with the second end 246B of the second connector 236 and is further characterized by the second end 244B of the first connector 234 aligning with the first end 246A of the second connector 236.

Figure 7:
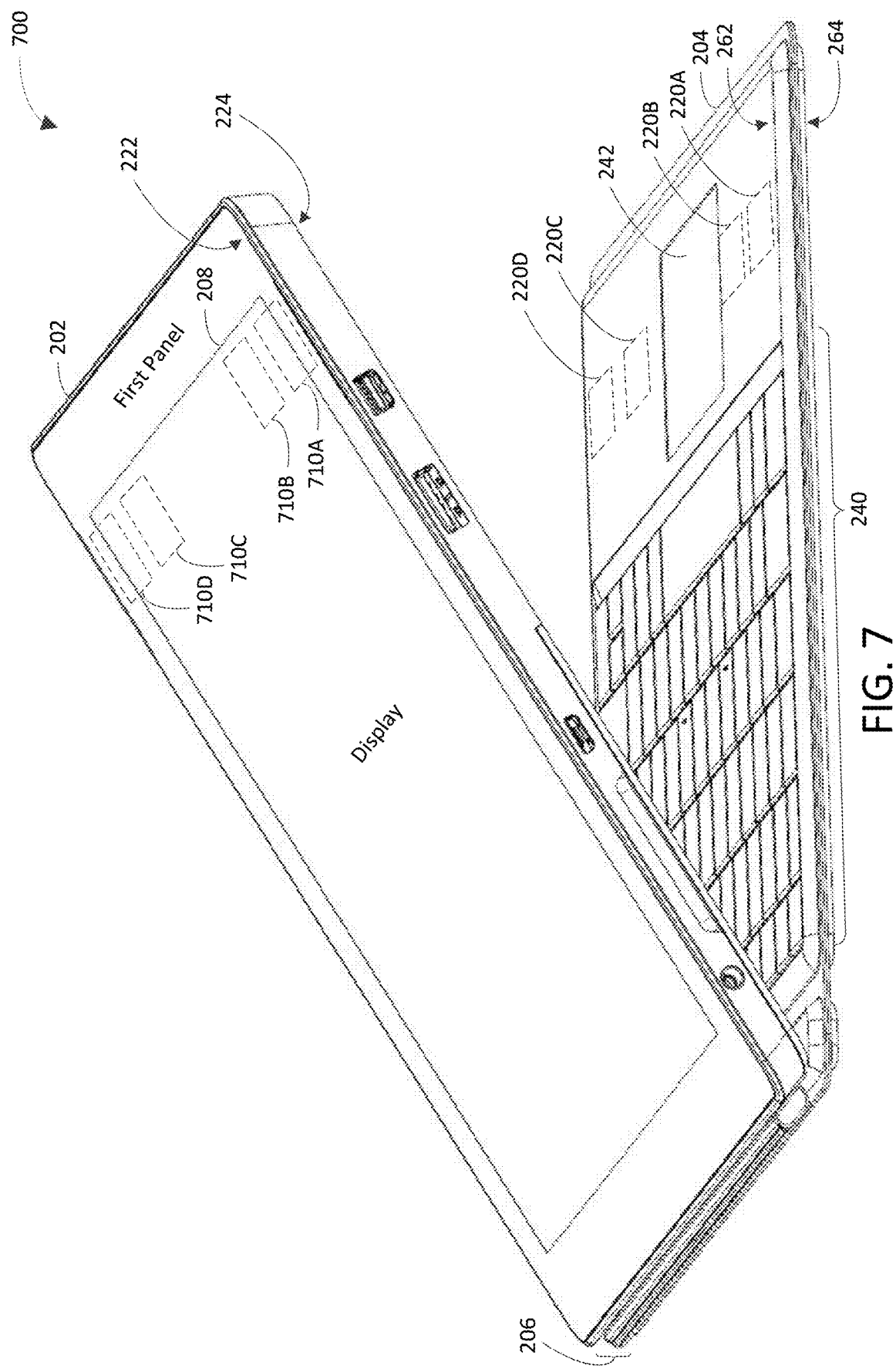

As shown in FIG. 7, the multi-panel computing device 700 includes the first panel 202, the second panel 204, and the hinge 206. The first panel 202 has the first and second opposing surfaces 222 and 224. The first panel 202 includes the display 208 and first magnetic coupling structures 710A-710D for non-limiting, illustrative purposes. The first magnetic coupling structures 710A-710D are configured to magnetically interact with the magnetic coupling structures 220A-220D (a.k.a. "second magnetic coupling structures 710A-710D"), which are included in the second panel 204, to cause the first panel 202 to become magnetically coupled to the second panel 204.

The second panel 204 has the first and second opposing surfaces 262 and 264. The second panel 204 includes the second magnetic coupling structures 220A-220D, the keyboard 240, and the touch pad 242. The second magnetic coupling structures 220A-220D are configured to magnetically interact with the first magnetic coupling structures 710A-710D to cause the second panel 204 to become magnetically coupled to the first panel 202. The second magnetic coupling structures 220A-220D may be further configured to magnetically interact with an object that is exterior to the multi-panel computing device 700 to cause the second panel 204 to become magnetically attached to the object.

In the embodiment of FIG. 7, a magnetic force between the first magnetic coupling structures 710A-710D and the second magnetic coupling structures 220A-220D causes the first surface 262 of the second panel 204 to become magnetically coupled to the second surface 224 of the first panel 202. As shown in FIG. 7, the second surface 224 of the first panel 202 faces the first surface 262 of the second panel 204, and the first surface 222 of the first panel 202 faces away from the second surface 264 of the second panel 204. The hinge 206 may be rotated (e.g., by the magnetic force and/or by a user of the multi-panel computing device 700) such that the second surface 224 of the first panel 202 is placed proximate the first surface 262 of the second panel 204. For instance, the second surface 224 of the first panel 202 may be placed in physical contact with the first surface 262 of the second panel 204, which may cause the hinge angle of the hinge 206 to be approximately 360 degrees. The second surface 224 of the first panel 202 being placed proximate the first surface 262 of the second panel 204 may enable the display 208 to be viewed while the second surface 264 of the second panel 204 is magnetically attached to an object that is exterior to the multi-panel computing device 700.

In an example embodiment, the second connector 236 (as depicted in FIGS. 2-3 and 5-6) is configured to connect to the first connector 234 in the first connector orientation (as described with reference to FIGS. 2-4) while the hinge 206 is in the first hinge orientation (in which the first surface 222 of the first panel 202 faces the second panel 204). In accordance with this embodiment, the second connector 236 is configured to connect to the first connector 234 in the second connector orientation (as described with reference to FIGS. 5-7) while the hinge is in the second hinge orientation (in which the second surface 224 of the first panel 202 faces the second panel 204).

It will be recognized that any of the multi-panel computing devices 200, 300, 400, 500, 600, and 700 may or may not include one or more of the hinge 206, the display 208, the first magnetic coupling structures 710A-710D, the second magnetic coupling structures 220A-220D, the first connector 234, the second connector 236, the keyboard 240, and/or the touch pad 242 shown among FIGS. 2-7. Furthermore, any of the multi-panel computing devices 200, 300, 400, 500, 600, and 700 may include components in addition to or in lieu of the hinge 206, the display 208, the first magnetic coupling structures 710A-710D, the second magnetic coupling structures 220A-220D, the first connector 234, the second connector 236, the keyboard 240, and/or the touch pad 242.

Figure 8:
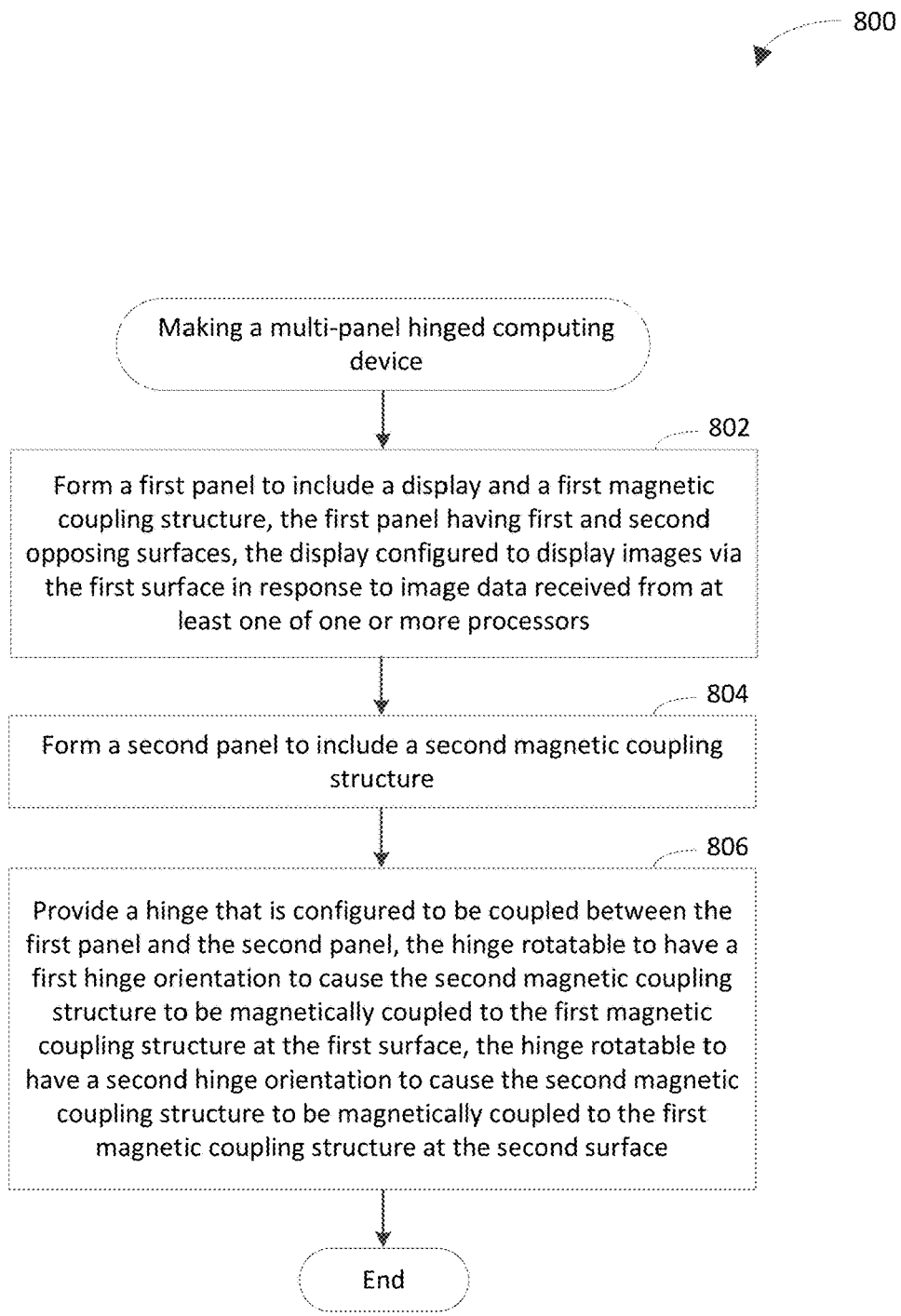
FIGS. 8 and 9 depict flowcharts of example methods for making a multi-panel hinged computing device in accordance with embodiments.
Figure 9:
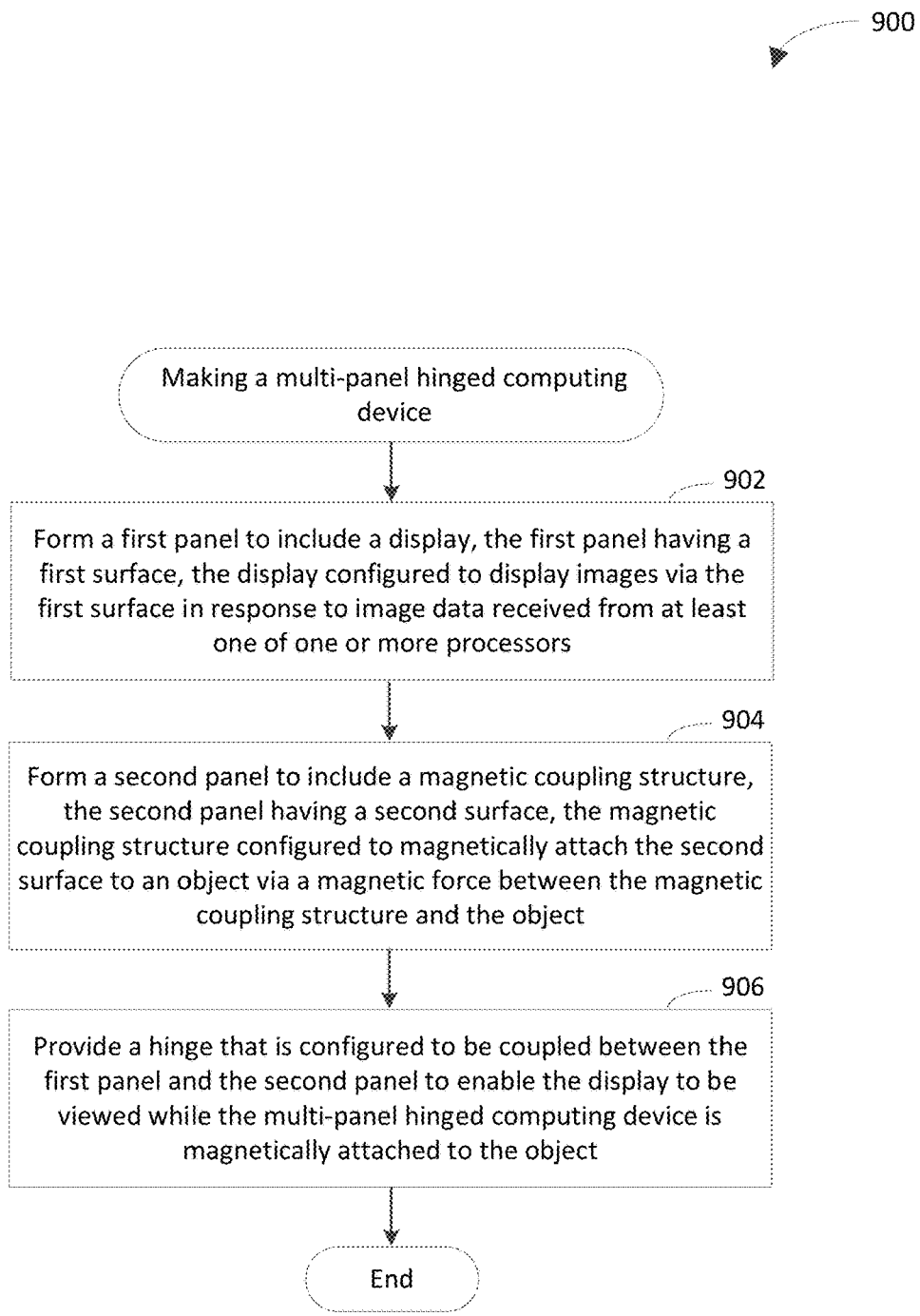
Figure 10:
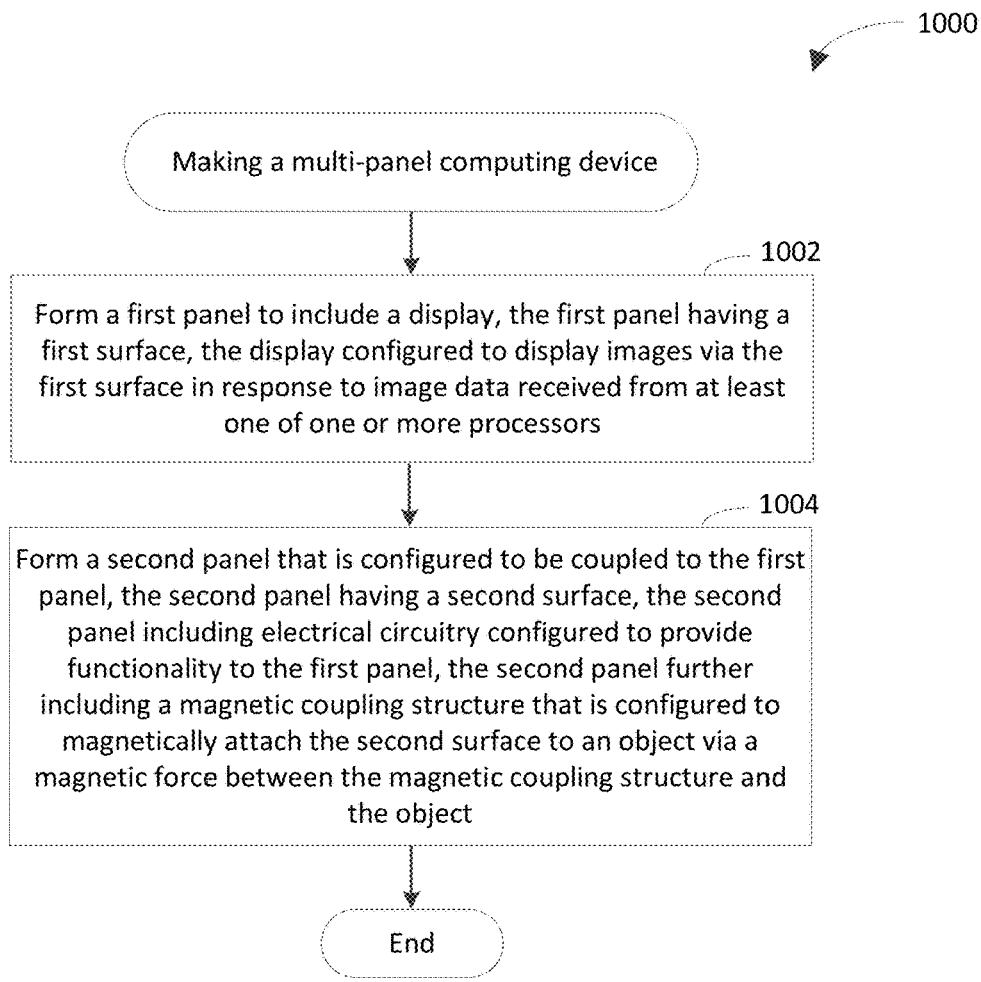
FIG. 10 depicts a flowchart of an example method for making a multi-panel computing device in accordance with an embodiment.
Figure 11:
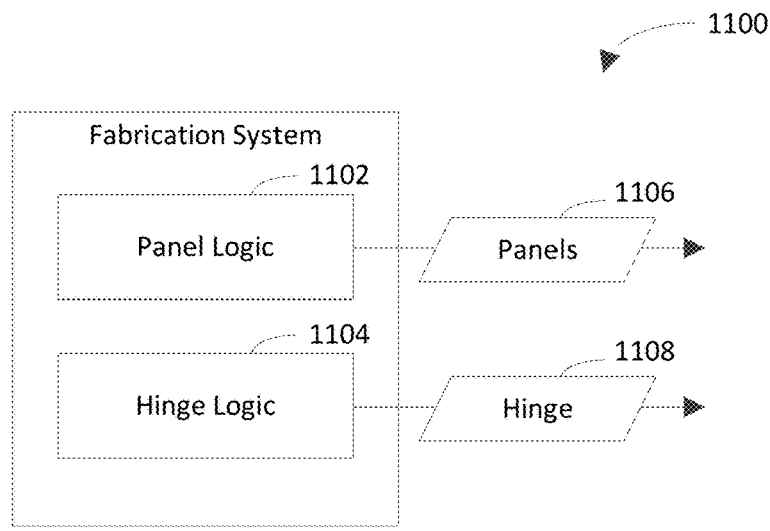
FIG. 11 is a block diagram of an example fabrication system in accordance with an embodiment.

FIGS. 8 and 9 depict flowcharts 800 and 900 of example methods for making a multi-panel hinged computing device in accordance with embodiments. FIG. 10 depicts a flowchart 1000 of an example method for making a multi-panel computing device in accordance with an embodiment. Flowcharts 800, 900, and 1000 may be performed by the fabrication system 1100 shown in FIG. 11, for example. The fabrication system 1100 includes panel logic 1102 and hinge logic 1104. Further structural and operational embodiments will be apparent to persons skilled in the relevant art(s) based on the discussion regarding the flowcharts 800, 900, and 1000.

As shown in FIG. 8, the method of the flowchart 800 begins at step 802. In step 802, a first panel is formed to include a display and a first magnetic coupling structure. The first panel has first and second opposing surfaces. The display is configured to display images via the first surface in response to image data received from at least one of one or more processors. The first magnetic coupling structure includes a first magnet and/or a first ferromagnetic element.

In an example implementation, the panel logic 1102 forms the first panel. For instance, the panel logic 1102 may form panels 1106, which include the first panel. In an aspect of this implementation, the panel logic 1102 may at least partially encapsulate the display and/or the first magnetic coupling structure in the first panel. The panel logic 1102 may form the first panel using any suitable technique including but not limited to injection molding (e.g., die casting, metal injection molding, thin-wall injection molding, and/or reaction injection molding) and steel forming (e.g., extrusion, hydraulic pressing, cold drawing, hot rolling, and/or cold rolling). Injection molding may be performed using any of a variety of materials including but not limited to metals, glasses, elastomers, thermoplastic polymers, and thermosetting polymers. In an aspect of this implementation, the panel logic 1102 may fabricate the display using any suitable techniques including but not limited to deposition (e.g., chemical vapor deposition (CVD)), photoresist coating, prebaking, exposure, pattern development, hard baking, etching, ashing, isolation formation, gate formation, contact formation, and interconnection formation).

At step 804, a second panel is formed to include a second magnetic coupling structure. The second magnetic coupling structure includes a second magnet and/or a second ferromagnetic element. In an example implementation, the panel logic 1102 forms the second panel. For instance, the panel logic 1102 may form the panels 1106, which include the second panel.

At step 806, a hinge that is configured to be coupled between the first panel and the second panel is provided. The hinge is rotatable to have a first hinge orientation to cause the second magnetic coupling structure to be magnetically coupled to the first magnetic coupling structure at the first surface. The hinge is rotatable to have a second hinge orientation to cause the second magnetic coupling structure to be magnetically coupled to the first magnetic coupling structure at the second surface. In an example implementation, the hinge logic 1104 provides a hinge 1108, which is configured to be coupled between the first panel and the second panel. For example, the hinge logic 1104 may construct the hinge using any suitable technique including but not limited to injection molding and steel forming. In another example, the hinge logic 1104 may couple the hinge 1104 between the first and second panels.

As shown in FIG. 9, the method of the flowchart 900 begins at step 902. In step 902, a first panel is formed to include a display. The first panel has a first surface. The display is configured to display images via the first surface in response to image data received from at least one of one or more processors. In an example implementation, the panel logic 1102 forms the first panel to include the display. For instance, the panel logic 1102 may form the panels 1106, which include the first panel.

At step 904, a second panel is formed to include a magnetic coupling structure. The second panel has a second surface. The magnetic coupling structure includes a magnet and/or a ferromagnetic element. The magnetic coupling structure is configured to magnetically attach the second surface to an object via a magnetic force between the magnetic coupling structure and the object. In an example implementation, the panel logic 1102 forms the second panel to include the magnetic coupling structure. For instance, the panel logic 1102 may form the panels 1106, which include the second panel.

At step 906, a hinge that is configured to be coupled between the first panel and the second panel is provided to enable the display to be viewed while the multi-panel hinged computing device is magnetically attached to the object. In an example implementation, the hinge logic 1104 provides the hinge 1108, which is configured to be coupled between the first panel and the second panel.

As shown in FIG. 10, the method of the flowchart 1000 begins at step 1002. In step 1002, a first panel is formed to include a display. The first panel has a first surface. The display is configured to display images via the first surface in response to image data received from at least one of one or more processors. In an example implementation, the panel logic 1102 forms the first panel to include the display. For instance, the panel logic 1102 may form the panels 1106, which include the first panel.

At step 1004, a second panel that is configured to be coupled to the first panel is formed. The second panel has a second surface. The second panel includes electrical circuitry configured to provide functionality to the first panel. The second panel further includes a magnetic coupling structure that includes a magnet and/or a ferromagnetic element. The magnetic coupling structure is configured to magnetically attach the second surface to an object via a magnetic force between the magnetic coupling structure and the object. In an example implementation, the panel logic 1102 forms the second panel. For instance, the panel logic 1102 may form the panels 1106, which include the second panel.

Figure 12:
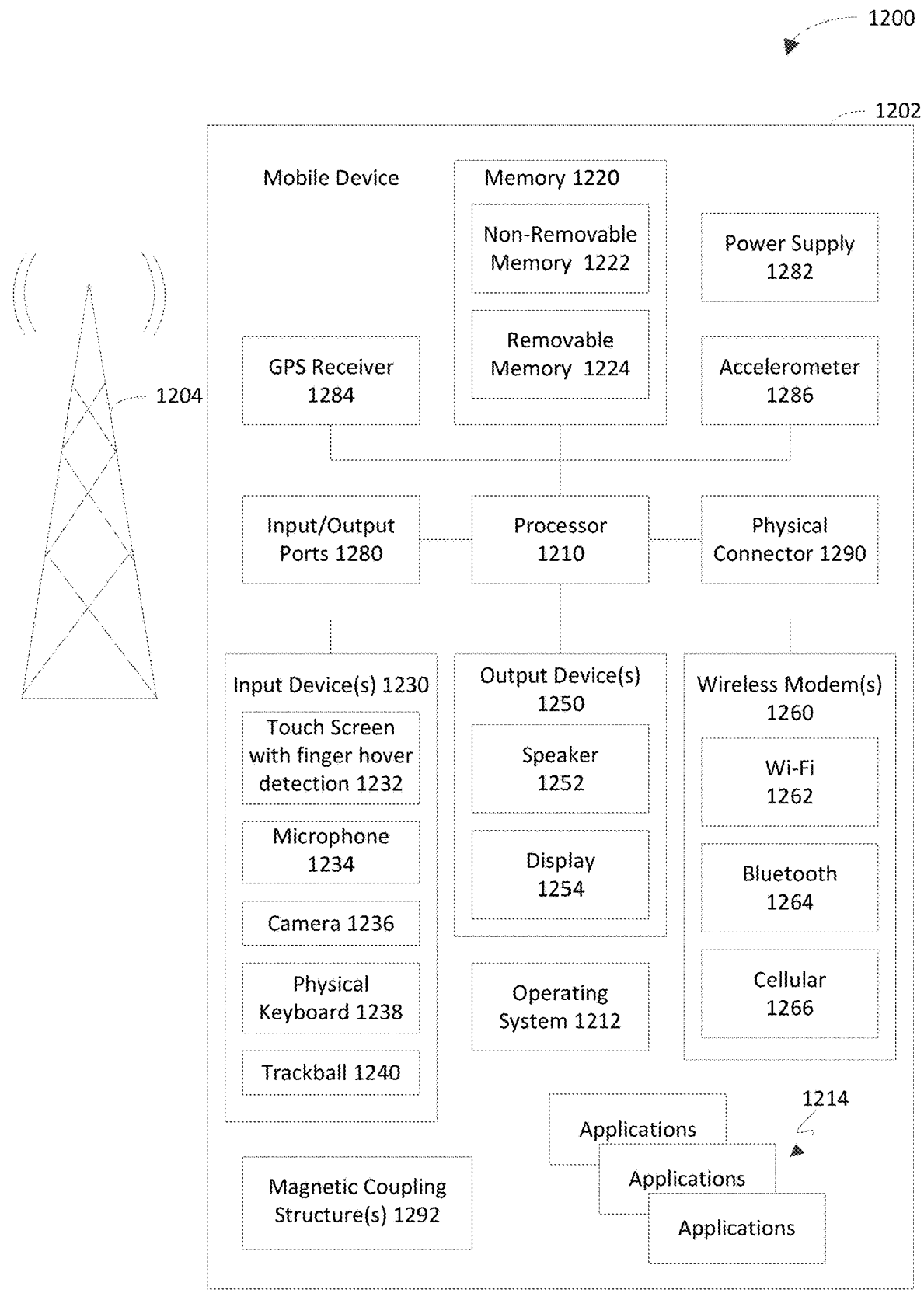
FIG. 12 is a system diagram of an exemplary mobile device in accordance with an embodiment.

FIG. 12 is a system diagram of an exemplary mobile device 1200 including a variety of optional hardware and software components, shown generally as 1202. Any components 1202 in the mobile device may communicate with any other component, though not all connections are shown, for ease of illustration. The mobile device 1200 may be any of a variety of computing devices (e.g., cell phone, smartphone, handheld computer, Personal Digital Assistant (PDA), etc.) and may allow wireless two-way communications with one or more mobile communications networks 1204, such as a cellular or satellite network, or with a local area or wide area network.

The mobile device 1200 may include a processor 1210 (e.g., signal processor, microprocessor, ASIC, or other control and processing logic circuitry) for performing such tasks as signal coding, data processing, input/output processing, power control, and/or other functions. An operating system 1212 may control the allocation and usage of the components 1202 and support for one or more applications 1214 (a.k.a. application programs). The applications 1214 may include common mobile computing applications (e.g., email applications, calendars, contact managers, web browsers, messaging applications) and any other computing applications (e.g., word processing applications, mapping applications, media player applications).

The mobile device 1200 may include memory 1220. The memory 1220 may include non-removable memory 1222 and/or removable memory 1224. The non-removable memory 1222 may include RAM, ROM, flash memory, a hard disk, or other well-known memory storage technologies. The removable memory 1224 may include flash memory or a Subscriber Identity Module (SIM) card, which is well known in GSM communication systems, or other well-known memory storage technologies, such as "smart cards." The memory 1220 may store data and/or code for running the operating system 1212 and the applications 1214. Example data may include web pages, text, images, sound files, video data, or other data sets to be sent to and/or received from one or more network servers or other devices via one or more wired or wireless networks. Memory 1220 may store a subscriber identifier, such as an International Mobile Subscriber Identity (IMSI), and an equipment identifier, such as an International Mobile Equipment Identifier (IMEI). Such identifiers may be transmitted to a network server to identify users and equipment.

The mobile device 1200 may support one or more input devices 1230, such as a touch screen 1232, microphone 1234, camera 1236, physical keyboard 1238 and/or trackball 1240 and one or more output devices 1250, such as a speaker 1252 and a display 1254. Touch screens, such as the touch screen 1232, may detect input in different ways. For example, capacitive touch screens detect touch input when an object (e.g., a fingertip) distorts or interrupts an electrical current running across the surface. As another example, touch screens may use optical sensors to detect touch input when beams from the optical sensors are interrupted. Physical contact with the surface of the screen is not necessary for input to be detected by some touch screens. For example, the touch screen 1232 may support a finger hover detection using capacitive sensing, as is well understood in the art. Other detection techniques may be used, including but not limited to camera-based detection and ultrasonic-based detection. To implement a finger hover, a user's finger is typically within a predetermined spaced distance above the touch screen, such as between 0.1 to 0.25 inches, or between 0.0.25 inches and 0.05 inches, or between 0.0.5 inches and 0.75 inches, or between 0.75 inches and 1 inch, or between 1 inch and 1.5 inches, etc.

The mobile device 1200 may include magnetic coupling structure(s) 1292. The magnetic coupling structure(s) 1292 are configured to magnetically couple panel(s) of the mobile device 1202 to other panel(s) of the mobile device 1200 and/or to another object (e.g., that is exterior to the mobile device 1200) in accordance with any one or more of the techniques described herein.

Other possible output devices (not shown) may include piezoelectric or other haptic output devices. Some devices may serve more than one input/output function. For example, touch screen 1232 and display 1254 may be combined in a single input/output device. The input devices 1230 may include a Natural User Interface (NUI). An NUI is any interface technology that enables a user to interact with a device in a "natural" manner, free from artificial constraints imposed by input devices such as mice, keyboards, remote controls, and the like. Examples of NUI methods include those relying on speech recognition, touch and stylus recognition, gesture recognition both on screen and adjacent to the screen, air gestures, head and eye tracking, voice and speech, vision, touch, gestures, and machine intelligence. Other examples of a NUI include motion gesture detection using accelerometers/gyroscopes, facial recognition, 3D displays, head, eye, and gaze tracking, immersive augmented reality and virtual reality systems, all of which provide a more natural interface, as well as technologies for sensing brain activity using electric field sensing electrodes (EEG and related methods). Thus, in one specific example, the operating system 1212 or applications 1214 may include speech-recognition software as part of a voice control interface that allows a user to operate the mobile device 1200 via voice commands. Furthermore, the mobile device 1200 may include input devices and software that allows for user interaction via a user's spatial gestures, such as detecting and interpreting gestures to provide input to a gaming application.

Wireless modem(s) 1260 may be coupled to antenna(s) (not shown) and may support two-way communications between the processor 1210 and external devices, as is well understood in the art. The modem(s) 1260 are shown generically and may include a cellular modem 1266 for communicating with the mobile communication network 1204 and/or other radio-based modems (e.g., Bluetooth 1264 and/or Wi-Fi 1262). At least one of the wireless modem(s) 1260 is typically configured for communication with one or more cellular networks, such as a GSM network for data and voice communications within a single cellular network, between cellular networks, or between the mobile device and a public switched telephone network (PSTN).

The mobile device may further include at least one input/output port 1280, a power supply 1282, a satellite navigation system receiver 1284, such as a Global Positioning System (GPS) receiver, an accelerometer 1286, and/or a physical connector 1290, which may be a USB port, IEEE 1394 (FireWire) port, and/or RS-232 port. The illustrated components 1202 are not required or all-inclusive, as any components may be deleted and other components may be added as would be recognized by one skilled in the art.

Although the operations of some of the disclosed methods are described in a particular, sequential order for convenient presentation, it should be understood that this manner of description encompasses rearrangement, unless a particular ordering is required by specific language set forth herein. For example, operations described sequentially may in some cases be rearranged or performed concurrently. Moreover, for the sake of simplicity, the attached figures may not show the various ways in which the disclosed methods may be used in conjunction with other methods.

Any one or more of the fabrication system 1100, the panel logic 1102, the hinge logic 1104, the flowchart 800, the flowchart 900, and/or the flowchart 1000 may be implemented in hardware, software, firmware, or any combination thereof. For example, any one or more of the fabrication system 1100, the panel logic 1102, the hinge logic 1104, the flowchart 800, the flowchart 900, and/or the flowchart 1000 may be implemented as computer program code configured to be executed in one or more processors. In another example, any one or more of the fabrication system 1100, the panel logic 1102, the hinge logic 1104, the flowchart 800, the flowchart 900, and/or the flowchart 1000 may be implemented as hardware logic/electrical circuitry.

For instance, in an embodiment, one or more of the fabrication system 1100, the panel logic 1102, the hinge logic 1104, the flowchart 800, the flowchart 900, and/or the flowchart 1000 may be implemented in a system-on-chip (SoC). The SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

III. Example Computer System

Figure 13:
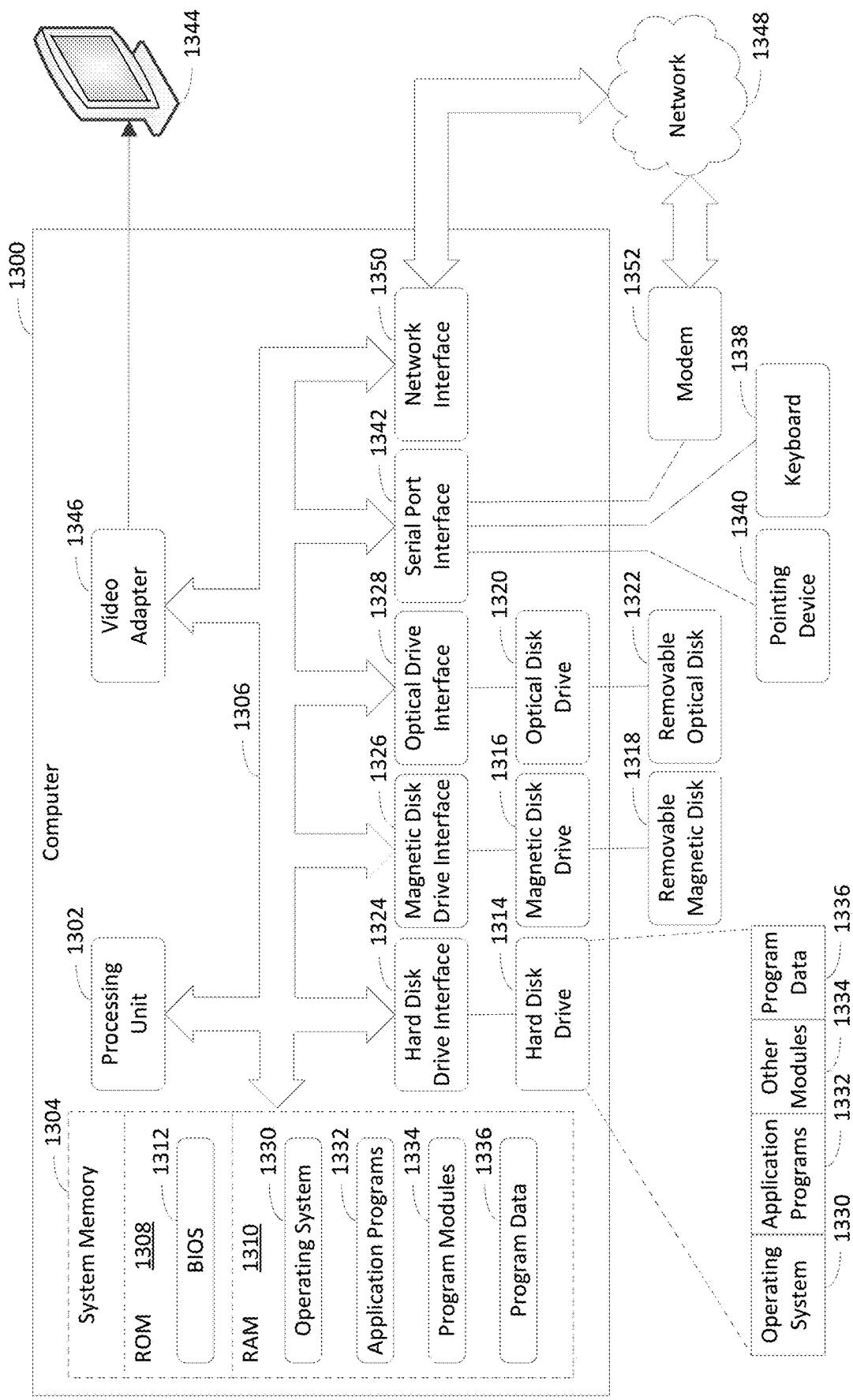
FIG. 13 depicts an example computer in which embodiments may be implemented.

FIG. 13 depicts an example computer 1300 in which embodiments may be implemented. For instance, any one or more of the multi-panel computing devices 100, 200, 300, 400, 500, 600, and 700 shown in respective FIGS. 1-7; fabrication system shown in FIG. 11; and/or mobile device 1200 shown in FIG. 12 may be implemented using computer 1300, including one or more features of computer 1300 and/or alternative features. Computer 1300 may be a general-purpose computing device in the form of a conventional personal computer, a mobile computer, or a workstation, for example, or computer 1300 may be a special purpose computing device. The description of computer 1300 provided herein is provided for purposes of illustration, and is not intended to be limiting. Embodiments may be implemented in further types of computer systems, as would be known to persons skilled in the relevant art(s).

As shown in FIG. 13, computer 1300 includes a processing unit 1302, a system memory 1304, and a bus 1306 that couples various system components including system memory 1304 to processing unit 1302. Bus 1306 represents one or more of any of several types of bus structures, including a memory bus or memory controller, a peripheral bus, an accelerated graphics port, and a processor or local bus using any of a variety of bus architectures. System memory 1304 includes read only memory (ROM) 1308 and random access memory (RAM) 1310. A basic input/output system 1312 (BIOS) is stored in ROM 1308.

Computer 1300 also has one or more of the following drives: a hard disk drive 1314 for reading from and writing to a hard disk, a magnetic disk drive 1316 for reading from or writing to a removable magnetic disk 1318, and an optical disk drive 1320 for reading from or writing to a removable optical disk 1322 such as a CD ROM, DVD ROM, or other optical media. Hard disk drive 1314, magnetic disk drive 1316, and optical disk drive 1320 are connected to bus 1306 by a hard disk drive interface 1324, a magnetic disk drive interface 1326, and an optical drive interface 1328, respectively. The drives and their associated computer-readable storage media provide nonvolatile storage of computer-readable instructions, data structures, program modules and other data for the computer. Although a hard disk, a removable magnetic disk and a removable optical disk are described, other types of computer-readable storage media can be used to store data, such as flash memory cards, digital video disks, random access memories (RAMs), read only memories (ROM), and the like.

A number of program modules may be stored on the hard disk, magnetic disk, optical disk, ROM, or RAM. These programs include an operating system 1330, one or more application programs 1332, other program modules 1334, and program data 1336. Application programs 1332 or program modules 1334 may include, for example, computer program logic for implementing any one or more of the panel logic 1102, hinge logic 1104, flowchart 800 (including any step of flowchart 800), flowchart 900 (including any step of flowchart 900), and/or flowchart 1000 (including any step of flowchart 1000), as described herein.

A user may enter commands and information into the computer 1300 through input devices such as keyboard 1338 and pointing device 1340. Other input devices (not shown) may include a microphone, joystick, game pad, satellite dish, scanner, touch screen, camera, accelerometer, gyroscope, or the like. These and other input devices are often connected to the processing unit 1302 through a serial port interface 1342 that is coupled to bus 1306, but may be connected by other interfaces, such as a parallel port, game port, or a universal serial bus (USB).

A display device 1344 (e.g., a monitor) is also connected to bus 1306 via an interface, such as a video adapter 1346.

In addition to display device 1344, computer 1300 may include other peripheral output devices (not shown) such as speakers and printers.

Computer 1300 is connected to a network 1348 (e.g., the Internet) through a network interface or adapter 1350, a modem 1352, or other means for establishing communications over the network. Modem 1352, which may be internal or external, is connected to bus 1306 via serial port interface 1342.

As used herein, the terms "computer program medium" and "computer-readable storage medium" are used to generally refer to media (e.g., non-transitory media) such as the hard disk associated with hard disk drive 1314, removable magnetic disk 1318, removable optical disk 1322, as well as other media such as flash memory cards, digital video disks, random access memories (RAMs), read only memories (ROM), and the like. Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Example embodiments are also directed to such communication media.

As noted above, computer programs and modules (including application programs 1332 and other program modules 1334) may be stored on the hard disk, magnetic disk, optical disk, ROM, or RAM. Such computer programs may also be received via network interface 1350 or serial port interface 1342. Such computer programs, when executed or loaded by an application, enable computer 1300 to implement features of embodiments discussed herein. Accordingly, such computer programs represent controllers of the computer 1300.

Example embodiments are also directed to computer program products comprising software (e.g., computer-readable instructions) stored on any computer-useable medium. Such software, when executed in one or more data processing devices, causes data processing device(s) to operate as described herein. Embodiments may employ any computer-useable or computer-readable medium, known now or in the future. Examples of computer-readable mediums include, but are not limited to storage devices such as RAM, hard drives, floppy disks, CD ROMs, DVD ROMs, zip disks, tapes, magnetic storage devices, optical storage devices, MEMS-based storage devices, nanotechnology-based storage devices, and the like.

It will be recognized that the disclosed technologies are not limited to any particular computer or type of hardware. Certain details of suitable computers and hardware are well known and need not be set forth in detail in this disclosure.

IV. Further Discussion of Some Example Embodiments

A first example multi-panel hinged computing device comprises one or more processors, a first panel, a second panel, and a hinge. The first panel has first and second opposing surfaces. The first panel comprises a display that is configured to display images via the first surface in response to image data received from at least one of the one or more processors. The first panel further comprises a first magnetic coupling structure that includes at least one of a first magnet or a first ferromagnetic element. The second panel comprises a second magnetic coupling structure that includes at least one of a second magnet or a second ferromagnetic element. The hinge is coupled between the first panel and the second panel. The second magnetic coupling structure is configured to magnetically couple to the first magnetic coupling structure at the first surface for a first hinge orientation of the hinge. The second magnetic coupling structure is configured to magnetically couple to the first magnetic coupling structure at the second surface for a second hinge orientation of the hinge.

In a first aspect of the first example multi-panel hinged computing device, the second panel has third and fourth opposing surfaces. In accordance with the first aspect, the second magnetic coupling structure is further configured to magnetically attach the third surface to an object while the hinge is in the second hinge orientation.

In a first implementation of the first aspect of the first example multi-panel hinged computing device, the second magnetic coupling structure is configured to magnetically attach the third surface to the object via a magnetic force between the second magnetic coupling structure and the object. In accordance with this implementation, the magnetic force is normal to the third surface and results in a frictional force that is greater than a tractive force between the third surface and the object. In further accordance with this implementation, the frictional force and the tractive force are parallel with the third surface. In further accordance with this implementation, the frictional force opposes the tractive force.

In a second implementation of the first aspect of the first example multi-panel hinged computing device, the second magnetic coupling structure is configured to magnetically attach the third surface to the object in absence of a mounting structure between the multi-panel hinged computing device and the object.

In a second aspect of the first example multi-panel hinged computing device, the hinge comprises a first connector and a second connector. The first connector has a first end and a second end along a first connection edge of the first panel. The second connector has a first end and a second end along a second connection edge of the second panel. In accordance with the second aspect, the second connector is connectable to the first connector in a first connector orientation in which the first end of the first connector aligns with the first end of the second connector and in which the second end of the first connector aligns with the second end of the second connector. In further accordance with the second aspect, the second connector is connectable to the first connector in a second connector orientation in which the second end of the first connector aligns with the first end of the second connector and in which the first end of the first connector aligns with the second end of the second connector. The second aspect of the first example multi-panel hinged computing device may be implemented in combination with the first aspect of the first example multi-panel hinged computing device, though the example embodiments are not limited in this respect.

In an implementation of the second aspect of the first example multi-panel hinged computing device, the second connector is configured to connect to the first connector in the first connector orientation while the hinge is in the first hinge orientation. In accordance with this implementation, the second connector is configured to connect to the first connector in the second connector orientation while the hinge is in the second hinge orientation.

In a third aspect of the first example multi-panel hinged computing device, the first panel has first and second opposing edges. In accordance with the third aspect, the second panel has third and fourth opposing edges. In further accordance with the third aspect, the hinge is coupled between the second edge of the first panel and the third edge of the second panel. In further accordance with the third aspect, the first magnetic coupling structure is positioned proximate the first edge of the first panel. In further accordance with the third aspect, the second magnetic coupling structure is positioned proximate the fourth edge of the second panel. The third aspect of the first example multi-panel hinged computing device may be implemented in combination with the first and/or second aspect of the first example multi-panel hinged computing device, though the example embodiments are not limited in this respect.

In a fourth aspect of the first example multi-panel hinged computing device, the second panel further comprises electrical circuitry configured to provide functionality to the first panel. The fourth aspect of the first example multi-panel hinged computing device may be implemented in combination with the first, second, and/or third aspect of the first example multi-panel hinged computing device, though the example embodiments are not limited in this respect.

In a first implementation of the fourth aspect of the first example multi-panel hinged computing device, the second panel comprises at least one of a keyboard or a game controller.

In a second implementation of the fourth aspect of the first example multi-panel hinged computing device, the second panel comprises at least one of a supplemental battery or an inductive battery charger.

In a third implementation of the fourth aspect of the first example multi-panel hinged computing device, the second panel comprises at least one of a speaker or a projector.

In a fourth implementation of the fourth aspect of the first example multi-panel hinged computing device, the second panel comprises a camera having an optical zoom lens.

In a fifth aspect of the first example multi-panel hinged computing device, at least one of the first panel or the second panel comprises a Hall effect sensor that is configured to determine a relative orientation of the second panel with reference to the first panel. The fifth aspect of the first example multi-panel hinged computing device may be implemented in combination with the first, second, third, and/or fourth aspect of the first example multi-panel hinged computing device, though the example embodiments are not limited in this respect.

In a first implementation of the fifth aspect of the first example multi-panel hinged computing device, the one or more processors are configured to modify an appearance of a user interface that is to be displayed by the display based at least in part on the relative orientation of the second panel with reference to the first panel.

In a second implementation of the fifth aspect of the first example multi-panel hinged computing device, the one or more processors are configured to at least one of enable one or more input-output components of the multi-panel hinged computing device or disable one or more input-output components of the multi-panel hinged computing device based at least in part on the relative orientation of the second panel with reference to the first panel.

In a third implementation of the fifth aspect of the first example multi-panel hinged computing device, the one or more processors are configured to modify calibration of one or more input-output components of the multi-panel hinged computing device based at least in part on the relative orientation of the second panel with reference to the first panel.

In a fourth implementation of the fifth aspect of the first example multi-panel hinged computing device, the one or more processors are configured to at least one of enable one or more antennas of the multi-panel hinged computing device or disable one or more antennas of the multi-panel hinged computing device based at least in part on the relative orientation of the second panel with reference to the first panel.

In a fifth implementation of the fifth aspect of the first example multi-panel hinged computing device, the one or more processors are configured to modify calibration of one or more antennas of the multi-panel hinged computing device based at least in part on the relative orientation of the second panel with reference to the first panel.

A second example multi-panel hinged computing device comprises one or more processors, a first panel, a second panel, and a hinge. The first panel has a first surface. The first panel comprises a display that is configured to display images via the first surface in response to image data received from at least one of the one or more processors. The second panel has a second surface. The second panel comprises a magnetic coupling structure that includes at least one of a magnet or a ferromagnetic element. The magnetic coupling structure is configured to magnetically attach the second surface to an object via a magnetic force between the magnetic coupling structure and the object. The hinge is coupled between the first panel and the second panel to enable the display to be viewed while the multi-panel hinged computing device is magnetically attached to the object.

In a first aspect of the second example multi-panel hinged computing device, the magnetic force is normal to the second surface and results in a frictional force that is greater than a tractive force between the second surface and the object. In accordance with the first aspect, the frictional force and the tractive force are parallel with the second surface. In further accordance with the first aspect, the frictional force opposes the tractive force.

In a second aspect of the second example multi-panel hinged computing device, the magnetic coupling structure is configured to magnetically attach the second surface to the object in absence of a mounting structure between the multi-panel hinged computing device and the object. The second aspect of the second example multi-panel hinged computing device may be implemented in combination with the first aspect of the second example multi-panel hinged computing device, though the example embodiments are not limited in this respect.

In a third aspect of the second example multi-panel hinged computing device, the first panel further comprises a second magnetic coupling structure that includes at least one of a second magnet or a second ferromagnetic element, the second magnetic coupling structure configured to magnetically attach to the magnetic coupling structure that is included in the second panel while the multi-panel hinged computing device is magnetically attached to the object. The third aspect of the second example multi-panel hinged computing device may be implemented in combination with the first and/or second aspect of the second example multi-panel hinged computing device, though the example embodiments are not limited in this respect.

In a fourth aspect of the second example multi-panel hinged computing device, the hinge comprises a first connector and a second connector. The first connector has a first end and a second end along a first connection edge of the first panel. The second connector has a first end and a second end along a second connection edge of the second panel. In accordance with the fourth aspect, the second connector is connectable to the first connector in a first connector orientation in which the first end of the first connector aligns with the first end of the second connector and in which the second end of the first connector aligns with the second end of the second connector. In further accordance with the fourth aspect, the second connector is connectable to the first connector in a second connector orientation in which the second end of the first connector aligns with the first end of the second connector and in which the first end of the first connector aligns with the second end of the second connector. The fourth aspect of the second example multi-panel hinged computing device may be implemented in combination with the first, second, and/or third aspect of the second example multi-panel hinged computing device, though the example embodiments are not limited in this respect.

In an implementation of the fourth aspect of the second example multi-panel hinged computing device, the first panel has a third surface that opposes the first surface. In accordance with this implementation, the second panel has a fourth surface that opposes the second surface. In further accordance with this implementation, the second connector is configured to connect to the first connector in the first connector orientation while the hinge is in a first hinge orientation such that the first hinge orientation is characterized by the first surface facing the fourth surface. In further accordance with this implementation, the second connector is configured to connect to the first connector in the second connector orientation while the hinge is in a second hinge orientation such that the second hinge orientation is characterized by the third surface facing the fourth surface.

In a fifth aspect of the second example multi-panel hinged computing device, the first panel has first and second opposing edges. In accordance with the fifth aspect, the second panel has third and fourth opposing edges. In further accordance with the fifth aspect, the hinge is coupled between the second edge of the first panel and the third edge of the second panel. In further accordance with the fifth aspect, the magnetic coupling structure is positioned proximate the fourth edge of the second panel. The fifth aspect of the second example multi-panel hinged computing device may be implemented in combination with the first, second, third, and/or fourth aspect of the second example multi-panel hinged computing device, though the example embodiments are not limited in this respect.

In a sixth aspect of the second example multi-panel hinged computing device, the magnetic coupling structure includes an electro-magnet that is controllable to selectively magnetically attach the second surface to the object. The sixth aspect of the second example multi-panel hinged computing device may be implemented in combination with the first, second, third, fourth, and/or fifth aspect of the second example multi-panel hinged computing device, though the example embodiments are not limited in this respect.

In a seventh aspect of the second example multi-panel hinged computing device, the first panel comprises a Hall effect sensor that is configured to determine a relative orientation of the second panel with reference to the first panel. The seventh aspect of the second example multi-panel hinged computing device may be implemented in combination with the first, second, third, fourth, fifth, and/or sixth aspect of the second example multi-panel hinged computing device, though the example embodiments are not limited in this respect.

In a first implementation of the seventh aspect of the second example multi-panel hinged computing device, the one or more processors are configured to modify an appearance of a user interface that is to be displayed by the display based at least in part on the relative orientation of the second panel with reference to the first panel.

In a second implementation of the seventh aspect of the second example multi-panel hinged computing device, the one or more processors are configured to at least one of enable one or more input-output components that are included in the first panel or disable one or more input-output components that are included in the first panel based at least in part on the relative orientation of the second panel with reference to the first panel.

In a third implementation of the seventh aspect of the second example multi-panel hinged computing device, the one or more processors are configured to modify calibration of one or more input-output components that are included in the first panel based at least in part on the relative orientation of the second panel with reference to the first panel.

In a fourth implementation of the seventh aspect of the second example multi-panel hinged computing device, the one or more processors are configured to at least one of enable one or more antennas that are included in the first panel or disable one or more antennas that are included in the first panel based at least in part on the relative orientation of the second panel with reference to the first panel.

In a fifth implementation of the seventh aspect of the second example multi-panel hinged computing device, the one or more processors are configured to modify calibration of one or more antennas that are included in the first panel based at least in part on the relative orientation of the second panel with reference to the first panel.

An example multi-panel computing device comprises one or more processors, a first panel and a second panel. The first panel has a first surface. The first panel comprises a display that is configured to display images via the first surface in response to image data received from at least one of the one or more processors. The second panel is coupled to the first panel. The second panel has a second surface. The second panel comprises electrical circuitry configured to provide functionality to the first panel. The second panel further comprises a magnetic coupling structure that includes at least one of a magnet or a ferromagnetic element. The magnetic coupling structure is configured to magnetically attach the second surface to an object via a magnetic force between the magnetic coupling structure and the object.

In a first aspect of the example multi-panel computing device, the magnetic force is normal to the second surface and results in a frictional force that is greater than a tractive force between the second surface and the object. In accordance with the first aspect, the frictional force and the tractive force are parallel with the second surface. In accordance with the first aspect, the frictional force opposes the tractive force.

In a second aspect of the example multi-panel computing device, the magnetic coupling structure is configured to magnetically attach the second surface to the object in absence of a mounting structure between the multi-panel computing device and the object. The second aspect of the example multi-panel computing device may be implemented in combination with the first aspect of the example multi-panel computing device, though the example embodiments are not limited in this respect.

In a third aspect of the example multi-panel computing device, the first panel comprises a second magnetic coupling structure that includes at least one of a second magnet or a second ferromagnetic element. In accordance with the third aspect, the second magnetic coupling structure is configured to magnetically attach to the magnetic coupling structure that is included in the second panel while the second surface is magnetically attached to the object. The third aspect of the example multi-panel computing device may be implemented in combination with the first and/or second aspect of the example multi-panel computing device, though the example embodiments are not limited in this respect.

In a fourth aspect of the example multi-panel computing device, the first panel has a third surface that opposes the first surface. In accordance with the fourth aspect, the second panel has a fourth surface that opposes the second surface. In further accordance with the fourth aspect, the fourth surface of the second panel is magnetically connectable to the first surface of the first panel in a first configuration of the second panel. In further accordance with the fourth aspect, the fourth surface of the second panel is magnetically connectable to the third surface of the first panel in a second configuration of the second panel. The fourth aspect of the example multi-panel computing device may be implemented in combination with the first, second, and/or third aspect of the example multi-panel computing device, though the example embodiments are not limited in this respect.

In a fifth aspect of the example multi-panel computing device, the second panel comprises at least one of a keyboard or a game controller. The fifth aspect of the example multi-panel computing device may be implemented in combination with the first, second, third, and/or fourth aspect of the example multi-panel computing device, though the example embodiments are not limited in this respect.

In an implementation of the fifth aspect of the example multi-panel computing device, the second panel comprises the keyboard. In accordance with this implementation, the keyboard includes a touch pad having first and second opposing sides. In further accordance with this implementation, a first portion of the magnetic coupling structure is positioned adjacent the first side of the touch pad. In further accordance with this implementation, a second portion of the magnetic coupling structure is positioned adjacent the second side of the touch pad.

In a sixth aspect of the example multi-panel computing device, the second panel comprises at least one of a supplemental battery or an inductive battery charger. The sixth aspect of the example multi-panel computing device may be implemented in combination with the first, second, third, fourth, and/or fifth aspect of the example multi-panel computing device, though the example embodiments are not limited in this respect.

In a seventh aspect of the example multi-panel computing device, the magnetic coupling structure includes an electromagnet that is controllable to selectively magnetically attach the second surface to the object. The seventh aspect of the example multi-panel computing device may be implemented in combination with the first, second, third, fourth, fifth, and/or sixth aspect of the example multi-panel computing device, though the example embodiments are not limited in this respect.

In an eighth aspect of the example multi-panel computing device, the second panel comprises at least one of a speaker or a projector. The eighth aspect of the example multi-panel computing device may be implemented in combination with the first, second, third, fourth, fifth, sixth, and/or seventh aspect of the example multi-panel computing device, though the example embodiments are not limited in this respect.

In a ninth aspect of the example multi-panel computing device, the second panel comprises a camera having an optical zoom lens. The ninth aspect of the example multi-panel computing device may be implemented in combination with the first, second, third, fourth, fifth, sixth, seventh, and/or eighth aspect of the example multi-panel computing device, though the example embodiments are not limited in this respect.

In a tenth aspect of the example multi-panel computing device, at least one of the first panel or the second panel comprises a Hall effect sensor that is configured to determine a relative orientation of the second panel with reference to the first panel. The tenth aspect of the example multi-panel computing device may be implemented in combination with the first, second, third, fourth, fifth, sixth, seventh, eighth, and/or ninth aspect of the example multi-panel computing device, though the example embodiments are not limited in this respect.

In a first implementation of the tenth aspect of the example multi-panel computing device, the one or more processors are configured to modify an appearance of a user interface that is to be displayed by the display based at least in part on the relative orientation of the second panel with reference to the first panel.

In a second implementation of the tenth aspect of the example multi-panel computing device, the one or more processors are configured to at least one of enable one or more input-output components of the multi-panel computing device or disable one or more input-output components of the multi-panel computing device based at least in part on the relative orientation of the second panel with reference to the first panel.

In a third implementation of the tenth aspect of the example multi-panel computing device, the one or more processors are configured to modify calibration of one or more input-output components of the multi-panel computing device based at least in part on the relative orientation of the second panel with reference to the first panel.

In a fourth implementation of the tenth aspect of the example multi-panel computing device, the one or more processors are configured to at least one of enable one or more antennas of the multi-panel computing device or disable one or more antennas of the multi-panel computing device based at least in part on the relative orientation of the second panel with reference to the first panel.

In a fifth implementation of the tenth aspect of the example multi-panel computing device, the one or more processors are configured to modify calibration of one or more antennas of the multi-panel computing device based at least in part on the relative orientation of the second panel with reference to the first panel.

In a first example method of making a multi-panel hinged computing device, a first panel is formed to include a display and a first magnetic coupling structure. The first panel has first and second opposing surfaces. The display is configured to display images via the first surface in response to image data received from at least one of one or more processors. The first magnetic coupling structure includes at least one of a first magnet or a first ferromagnetic element. A second panel is formed to include a second magnetic coupling structure. The second magnetic coupling structure includes at least one of a second magnet or a second ferromagnetic element. A hinge that is configured to be coupled between the first panel and the second panel is provided. The hinge is rotatable to have a first hinge orientation to cause the second magnetic coupling structure to be magnetically coupled to the first magnetic coupling structure at the first surface. The hinge is rotatable to have a second hinge orientation to cause the second magnetic coupling structure to be magnetically coupled to the first magnetic coupling structure at the second surface.

In a second example method of making a multi-panel hinged computing device, a first panel is formed to include a display. The first panel has a first surface. The display is configured to display images via the first surface in response to image data received from at least one of one or more processors. A second panel is formed to include a magnetic coupling structure. The second panel has a second surface. The magnetic coupling structure includes at least one of a magnet or a ferromagnetic element. The magnetic coupling structure is configured to magnetically attach the second surface to an object via a magnetic force between the magnetic coupling structure and the object. A hinge that is configured to be coupled between the first panel and the second panel is provided to enable the display to be viewed while the multi-panel hinged computing device is magnetically attached to the object.

In a method of making a multi-panel computing device, a first panel is formed to include a display. The first panel has a first surface. The display is configured to display images via the first surface in response to image data received from at least one of one or more processors. A second panel that is configured to be coupled to the first panel is formed. The second panel has a second surface. The second panel comprises electrical circuitry configured to provide functionality to the first panel. The second panel further comprises a magnetic coupling structure that includes at least one of a magnet or a ferromagnetic element. The magnetic coupling structure is configured to magnetically attach the second surface to an object via a magnetic force between the magnetic coupling structure and the object.

V. Conclusion

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims, and other equivalent features and acts are intended to be within the scope of the claims.

What is claimed is:

1. A multi-panel hinged computing device comprising:
   one or more processors;
   a first panel having first and second opposing surfaces, the first panel comprising a display that is configured to display images via the first surface in response to image data received from at least one of the one or more processors, the first panel further comprising a first magnetic coupling structure that includes at least one of a first magnet or a first ferromagnetic element;
   a second panel having third and fourth opposing surfaces, the second panel comprising a second magnetic coupling structure that includes at least one of a second magnet or a second ferromagnetic element; and
   a hinge coupled between the first panel and the second panel, the second magnetic coupling structure configured to magnetically couple to the first magnetic coupling structure at the first surface for a first hinge orientation of the hinge, the second magnetic coupling structure configured to magnetically couple to the first magnetic coupling structure at the second surface for a second hinge orientation of the hinge;
   wherein the second magnetic coupling structure is configured to magnetically attach the third surface to an object via a magnetic force between the second magnetic coupling structure and the object while the hinge is in the second hinge orientation;
   wherein the magnetic force is normal to the third surface and results in a frictional force that opposes the tractive force and that is greater than a tractive force between the third surface and the object; and
   wherein the frictional force and the tractive force are parallel with the third surface.

2. The multi-panel hinged computing device of claim 1, wherein the second magnetic coupling structure is configured to magnetically attach the third surface to the object in absence of a mounting structure between the multi-panel hinged computing device and the object.

3. The multi-panel hinged computing device of claim 1, wherein the second magnetic coupling structure includes an electro-magnet that is controllable to selectively magnetically attach the third surface to the object while the hinge is in the second hinge orientation.

4. The multi-panel hinged computing device of claim 1, wherein the hinge comprises:
   a first connector having a first end and a second end along a first connection edge of the first panel; and
   a second connector having a first end and a second end along a second connection edge of the second panel;
   wherein the second connector is connectable to the first connector in a first connector orientation in which the first end of the first connector aligns with the first end of the second connector and in which the second end of the first connector aligns with the second end of the second connector; and
   wherein the second connector is connectable to the first connector in a second connector orientation in which the second end of the first connector aligns with the first end of the second connector and in which the first end of the first connector aligns with the second end of the second connector.

5. The multi-panel hinged computing device of claim 4, wherein the second connector is configured to connect to the first connector in the first connector orientation while the hinge is in the first hinge orientation; and
   wherein the second connector is configured to connect to the first connector in the second connector orientation while the hinge is in the second hinge orientation.

6. The multi-panel hinged computing device of claim 1, wherein the first panel has first and second opposing edges;
   wherein the second panel has third and fourth opposing edges;
   wherein the hinge is coupled between the second edge of the first panel and the third edge of the second panel;
   wherein the first magnetic coupling structure is positioned proximate the first edge of the first panel; and
   wherein the second magnetic coupling structure is positioned proximate the fourth edge of the second panel.

7. The multi-panel hinged computing device of claim 1, wherein the second panel further comprises electrical circuitry configured to provide functionality to the first panel.

8. The multi-panel hinged computing device of claim 7, wherein the second panel comprises at least one of a keyboard or a game controller.

9. The multi-panel hinged computing device of claim 7, wherein the second panel comprises at least one of a supplemental battery or an inductive battery charger.

10. The multi-panel hinged computing device of claim 7, wherein the second panel comprises at least one of a speaker, a projector, or a camera having an optical zoom lens.

11. The multi-panel hinged computing device of claim 1, wherein at least one of the first panel or the second panel comprises a Hall effect sensor that is configured to determine the relative orientation of the second panel with reference to the first panel.

12. The multi-panel hinged computing device of claim 11, wherein the one or more processors are configured to modify an appearance of a user interface that is to be displayed by the display based at least in part on the relative orientation of the second panel with reference to the first panel.

13. The multi-panel hinged computing device of claim 11, wherein the one or more processors are configured to at least one of enable one or more input-output components of the multi-panel hinged computing device or disable one or more input-output components of the multi-panel hinged computing device based at least in part on the relative orientation of the second panel with reference to the first panel.

14. The multi-panel hinged computing device of claim 11, wherein the one or more processors are configured to modify calibration of one or more input-output components of the multi-panel hinged computing device based at least in part on the relative orientation of the second panel with reference to the first panel.

15. The multi-panel hinged computing device of claim 1, wherein the one or more processors are configured to at least one of enable one or more antennas of the multi-panel hinged computing device or disable one or more antennas of the multi-panel hinged computing device based at least in part on the relative orientation of the second panel with reference to the first panel.

16. The multi-panel hinged computing device of claim 1, wherein the one or more processors are configured to modify calibration of one or more antennas of the multi-panel hinged computing device based at least in part on the relative orientation of the second panel with reference to the first panel.

17. The multi-panel hinged computing device of claim 16, wherein the one or more processors are configured to decrease a power associated with the one or more antennas based at least in part on an angle between the first surface of the first panel and the fourth surface of the second panel being between approximately 90 degrees and approximately 180 degrees.

18. The multi-panel hinged computing device of claim 1, wherein the second panel has third and fourth opposing surfaces, and wherein the second magnetic coupling structure is further configured to magnetically attract the third surface to an object while the hinge is in the second hinge orientation via a magnetic force between the second magnetic coupling structure and the object.

19. The multi-panel hinged computing device of claim 1, wherein the one or more processors are configured to decrease a volume of a speaker, decrease a sensitivity of a microphone, decrease a brightness of a display, or decrease a focal length of a camera of the multi-panel hinged computing device based at least in part on an angle between the first surface of the first panel and the fourth surface of the second panel being between approximately 90 degrees and approximately 180 degrees.

20. A multi-panel hinged computing device comprising:
one or more processors;
a first panel having a first surface, the first panel comprising a display that is configured to display images via the first surface in response to image data received from at least one of the one or more processors;
a second panel having a second surface, the second panel comprising a magnetic coupling structure that includes at least one of a magnet or a ferromagnetic element, the magnetic coupling structure configured to magnetically attach the second surface to an object via a magnetic force between the magnetic coupling structure and the object; and
a hinge coupled between the first panel and the second panel to enable the display to be viewed while the multi-panel hinged computing device is magnetically attached to the object, wherein the magnetic force is normal to the second surface and results in a frictional force that is greater than a tractive force between the second surface and the object;
wherein the frictional force and the tractive force are parallel with the second surface; and
wherein the frictional force opposes the tractive force.

21. A multi-panel computing device comprising:
one or more processors;
a first panel having a first surface, the first panel comprising a display that is configured to display images via the first surface in response to image data received from at least one of the one or more processors; and
a second panel coupled to the first panel, the second panel having a second surface, the second panel comprising:
electrical circuitry configured to provide functionality to the first panel; and
a magnetic coupling structure that includes at least one of a magnet or a ferromagnetic element, the magnetic coupling structure configured to magnetically attach the second surface to an object via a magnetic force between the magnetic coupling structure and the object,
wherein the magnetic force is normal to the second surface and results in a frictional force that is greater than a tractive force between the second surface and the object;
wherein the frictional force and the tractive force are parallel with the second surface; and
wherein the frictional force opposes the tractive force.

22. The multi-panel computing device of claim 21, wherein the second panel comprises a keyboard;
wherein the keyboard includes a touch pad having first and second opposing sides;
wherein a first portion of the magnetic coupling structure is positioned adjacent the first side of the touch pad; and
wherein a second portion of the magnetic coupling structure is positioned adjacent the second side of the touch pad.

23. The multi-panel computing device of claim 21, wherein the one or more processors are configured to modify an appearance of a user interface that is to be displayed by the display based at least in part on a relative orientation of the second panel with reference to the first panel.

* * * * *